United States Patent
Shin et al.

(10) Patent No.: US 11,010,169 B2
(45) Date of Patent: May 18, 2021

(54) PROCESSOR DEVICE COLLECTING PERFORMANCE INFORMATION THROUGH COMMAND-SET-BASED REPLAY

(71) Applicant: Samsung Electronics Co., Ltd., Suwon-si (KR)

(72) Inventors: Youngsam Shin, Hwaseong-si (KR); Dong-Hoon Yoo, Suwon-si (KR); Young-Hwan Heo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 16/132,784

(22) Filed: Sep. 17, 2018

(65) Prior Publication Data
US 2019/0213010 A1    Jul. 11, 2019

(30) Foreign Application Priority Data

Jan. 9, 2018    (KR) .......................... 10-2018-0002881

(51) Int. Cl.
| | |
|---|---|
| *G06F 15/00* | (2006.01) |
| *G06F 9/30* | (2018.01) |
| *G06F 9/38* | (2018.01) |
| *G06F 11/34* | (2006.01) |

(52) U.S. Cl.
CPC ........ *G06F 9/3836* (2013.01); *G06F 9/30101* (2013.01); *G06F 11/3409* (2013.01)

(58) Field of Classification Search
CPC .. G06F 11/3409; G06F 11/00; G06F 9/30101; G06F 11/348; G06F 9/3836
USPC ................................................... 712/216
See application file for complete search history.

(56) References Cited

U.S. PATENT DOCUMENTS

| | | | | |
|---|---|---|---|---|
| 5,596,760 | A * | 1/1997 | Ueda | G06F 9/3001 |
| | | | | 712/241 |
| 5,982,981 | A * | 11/1999 | Satoh | H04N 1/32112 |
| | | | | 386/292 |
| 6,792,392 | B1 | 9/2004 | Knight | |
| 7,095,416 | B1 | 8/2006 | Johns et al. | |
| 7,961,194 | B2 | 6/2011 | Bakalash et al. | |
| 8,462,166 | B2 | 6/2013 | Sowerby et al. | |
| 8,587,593 | B2 | 11/2013 | Elmieh et al. | |
| 9,275,491 | B2 | 3/2016 | Bolz et al. | |
| 9,535,815 | B2 | 1/2017 | Smith et al. | |
| 9,721,322 | B2 | 8/2017 | Nagai | |
| 2002/0122210 | A1* | 9/2002 | Mitchell Ilbery | H04N 1/4052 |
| | | | | 358/3.04 |
| 2013/0057563 | A1* | 3/2013 | Persson | G06F 9/485 |
| | | | | 345/522 |

* cited by examiner

*Primary Examiner* — Chun Kuan Lee
(74) *Attorney, Agent, or Firm* — Muir Patent Law, PLLC

(57) ABSTRACT

A processor device includes a scheduler and a performance counter. The scheduler schedules commands of a first command set and commands of a second command set for a functional unit. A performance counter counts numbers of times where events of interest respectively occur while the functional unit processes first operations directed by the first command set and second operations directed by the second command set. The commands of the first command set are repeatedly scheduled such that the numbers of times for all the events of interest are counted with regard to the first operations. The commands of the second command set are scheduled after the numbers of times for all the events of interest are counted with regard to the first operations.

19 Claims, 20 Drawing Sheets

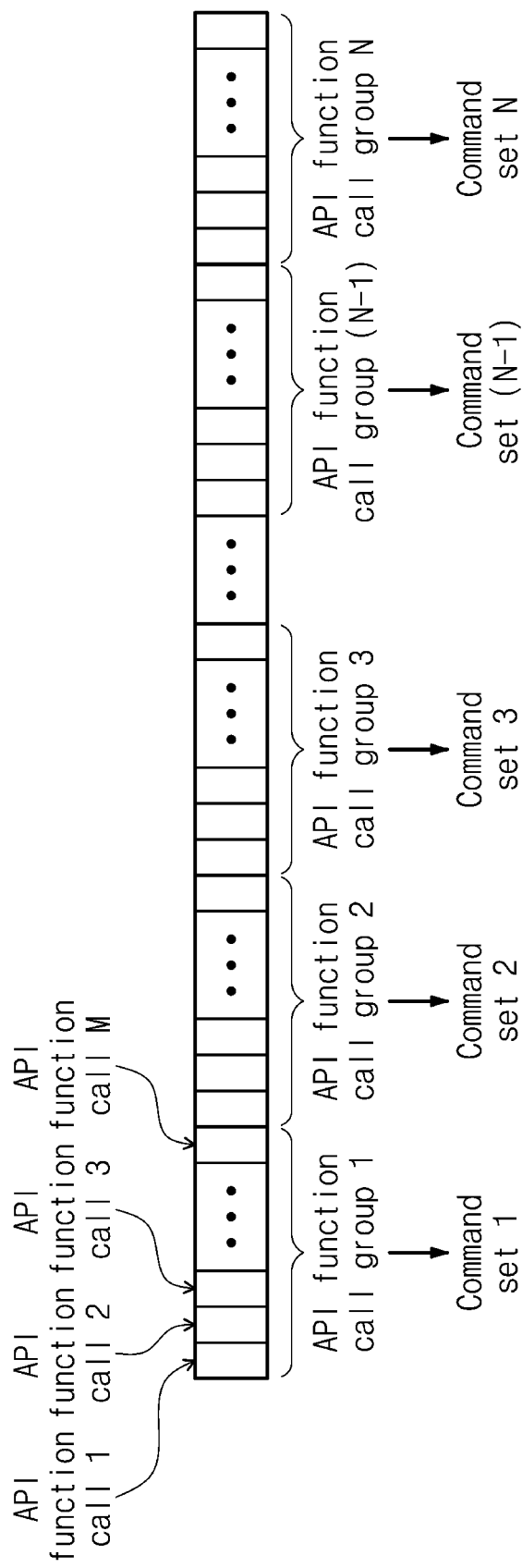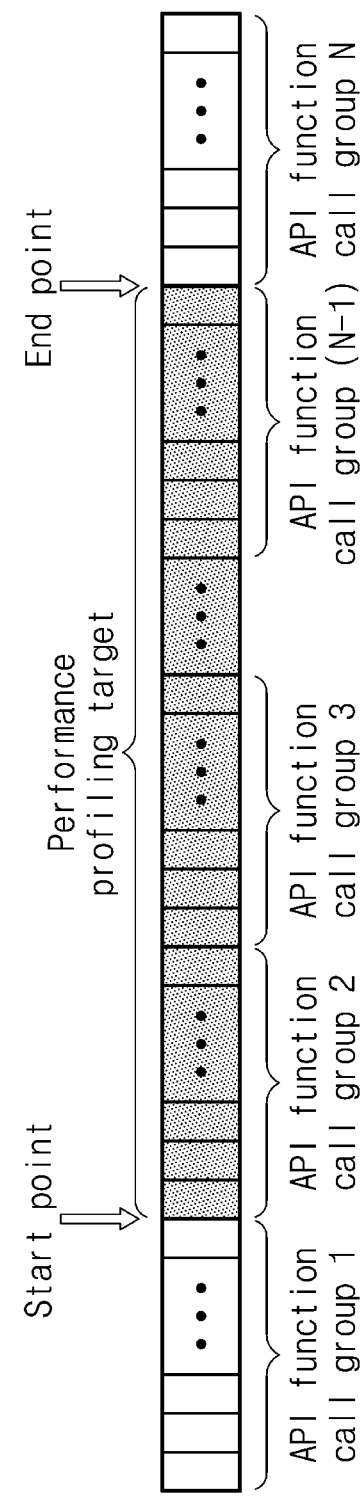

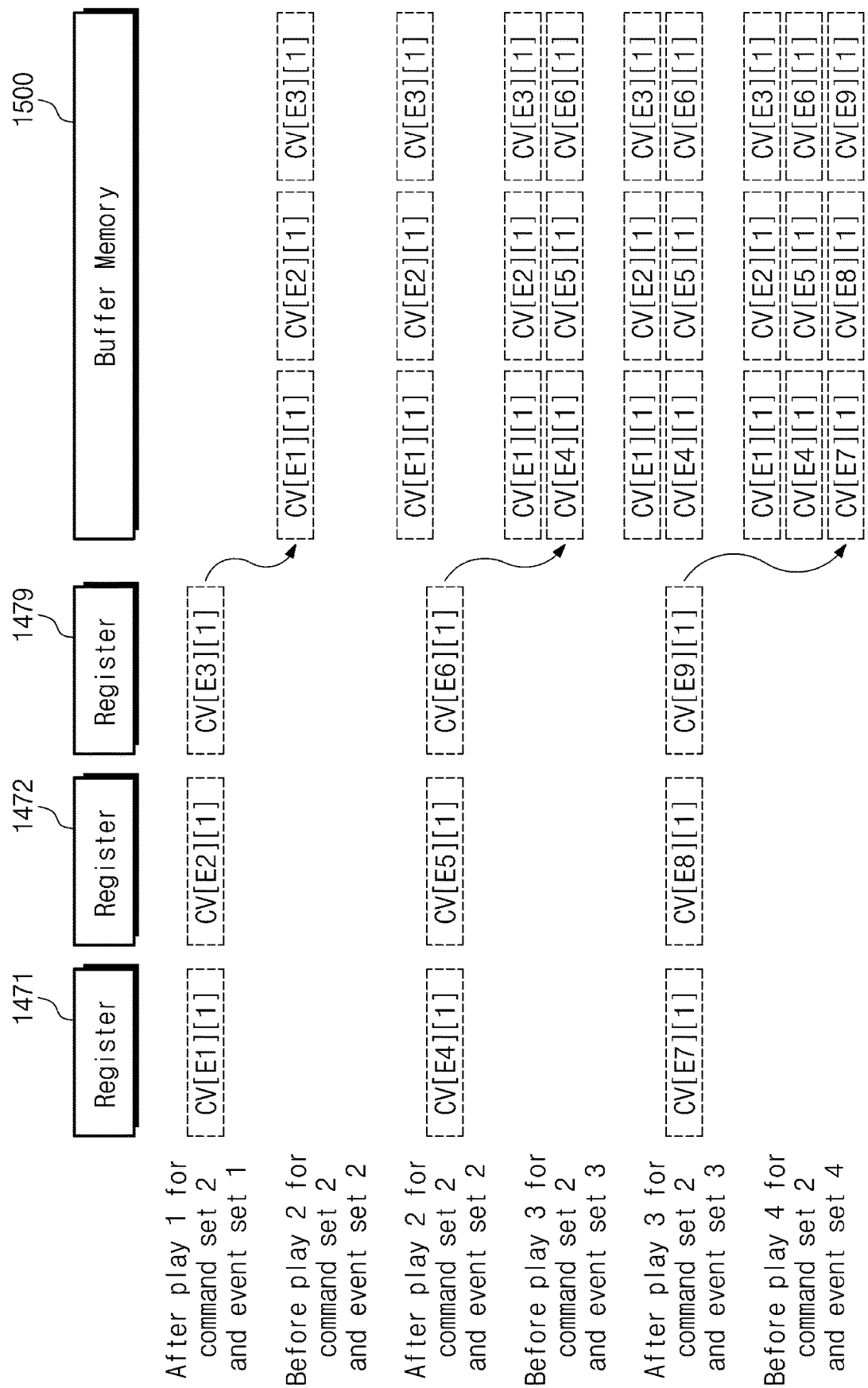

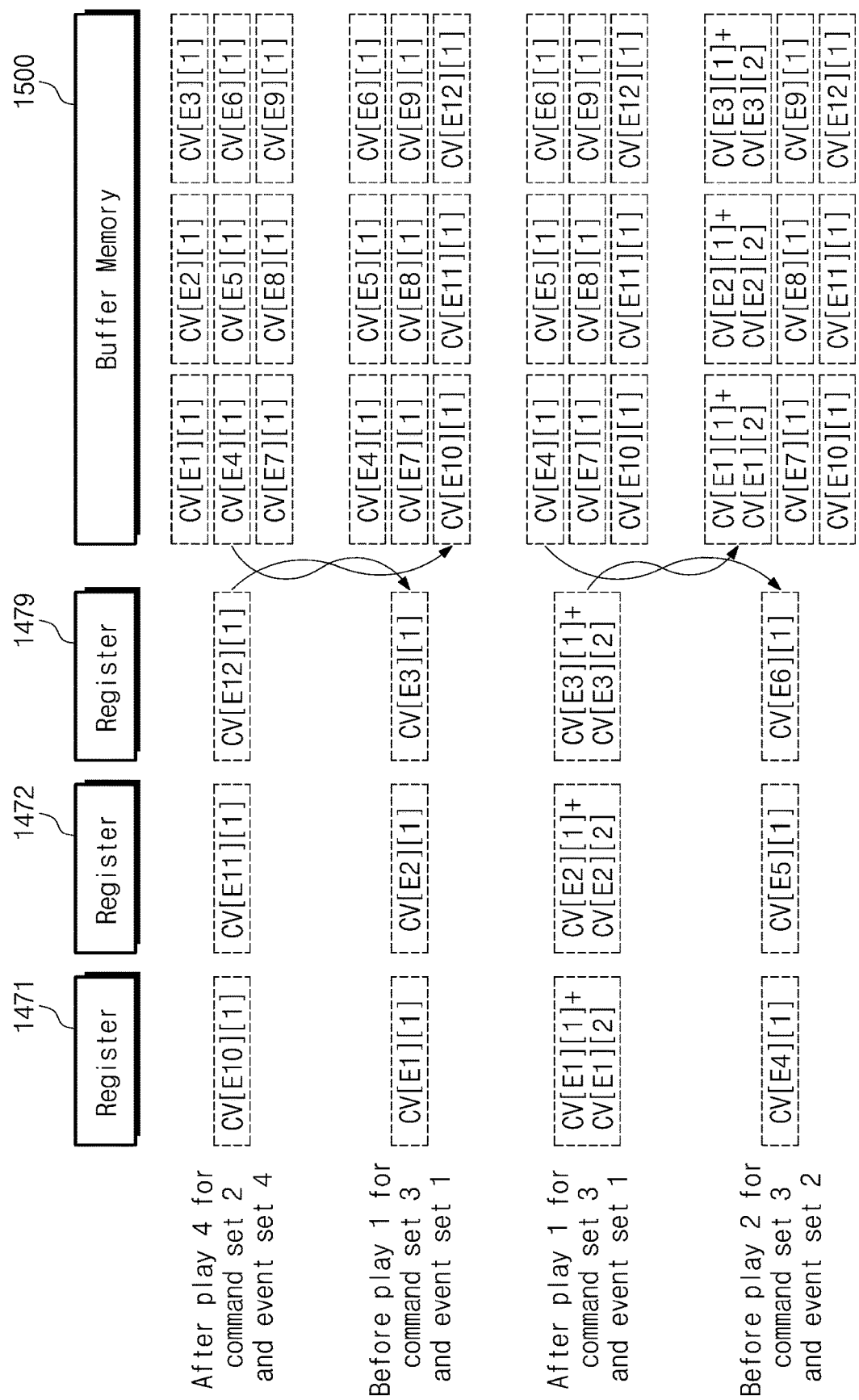

PROCESSOR DEVICE COLLECTING PERFORMANCE INFORMATION THROUGH COMMAND-SET-BASED REPLAY

CROSS-REFERENCE TO RELATED APPLICATIONS

This application claims priority under 35 U.S.C. § 119 to Korean Patent Application No. 10-2018-0002881 filed on Jan. 9, 2018, in the Korean Intellectual Property Office, the content of which is incorporated by reference herein in its entirety.

TECHNICAL FIELD

The present disclosure relates to an electronic device, and more particularly, relates to operations and configurations of a processor device configured to process various operations.

DESCRIPTION OF RELATED ART

In recent years, various types of electronic devices are being used. An electronic device performs its own functions according to operations of electronic circuits and devices included in the electronic device. For example, the electronic device may include a processor device, and may provide various functions according to operations of the processor device.

The processor device performs logical operations and/or arithmetic operations to process requests (e.g., from a user or from other components inside the electronic device). As such, the processor device outputs operation results corresponding to the requests. The operation results are used to operate the electronic device.

For example, processor devices may be classified into general-purpose processor devices and dedicated (or special-purpose) processor devices. A general-purpose processor device may support various general operations, and may intervene in overall operations of the electronic device. On the other hand, a dedicated processor device may be configured to support specific types of operations. A graphic processor device is an example of the dedicated processor device. For example, a graphic processor device may perform operations specialized for graphic processing, by using parallel processors for processing a large amount of graphic data rapidly.

While operations are processed by the processor device, various events may occur. For example, required data may be present in or absent from a cache memory (i.e., cache hit or cache miss), or a collision may occur between data paths through a bus. Such events may affect performance of operations to be processed by the processor device.

SUMMARY

Example embodiments of the present disclosure may provide configurations and operations for collecting performance information from events occurring with regard to operations of a processor device. In some example embodiments of the present disclosure, the performance information may be collected through a command-set-based replay.

In some embodiments, the disclosure is directed to a processor device comprising: a scheduler configured to schedule first commands of a first command set and second commands of a second command set such that a processor circuit processes first operations directed by the first command set and second operations directed by the second command set; a performance counter configured to count numbers of times where events of interest occur while the processor circuit processes the first operations and the second operations, where each of the numbers of times corresponds to one of the events of interest; and registers configured to store count values corresponding to the counted numbers of times, wherein, when a number of the events of interest is greater than a number of the registers, the first operations are repeatedly processed such that the numbers of times for all the events of interest are counted with regard to the first operations, and the second operations are processed after the numbers of times for all the events of interest are counted with regard to the first operations.

In some embodiments, the disclosure is directed to a processor device comprising: a scheduler configured to schedule first commands of a first command set and second commands of a second command set; and a performance counter configured to count numbers of times where events of interest occur with regard to processing first operations directed by the first command set and second operations directed by the second command set, where each of the numbers of times corresponds to one of the events of interest, wherein the first commands of the first command set are repeatedly scheduled such that the numbers of times for all the events of interest are counted with regard to the first operations, and wherein the second commands of the second command set are scheduled after the numbers of times for all the events of interest are counted with regard to the first operations.

In some embodiments, the disclosure is directed to a processor device comprising: a processor circuit configured to process operations directed by each of a plurality of command sets; and a performance counter configured to count numbers of times where events of interest occur while the processor circuit processes the operations directed by each of the plurality of command sets, where each of the numbers of times corresponds to one of the events of interest, wherein the operations directed by each of the plurality of command sets are repeatedly processed until the numbers of times for all the events of interest are counted with regard to the operations directed by each of the plurality of command sets, and wherein, after the numbers of times for all the events of interest are counted with regard to first operations directed by a first command set of the plurality of command sets, second operations directed by a second command set of the plurality of command sets are processed. In addition, consistency of commands and data for a replay may be improved. Accordingly, the replay may be implemented based on consistent commands and data, and it may be easy to make correlations between replay results and match the replay results with each other.

BRIEF DESCRIPTION OF THE DRAWINGS

The above and other objects and features of the present disclosure will become apparent from the following descriptions with reference to the accompanying figures.

FIG. 4 is a conceptual diagram for describing an example relationship between a function call and a command set with regard to example operations of FIG. 3.

FIG. 5 is a conceptual diagram for describing an example method of collecting performance information with regard to operations of a graphic processor device of FIG. 1.

FIGS. 16, 17A, and 17B are conceptual diagrams for describing example methods of managing count values with regard to an example replay of FIGS. 12 to 15.

DETAILED DESCRIPTION

Below, example embodiments will be described in detail and clearly with reference to the accompanying drawings.

Figure 1:
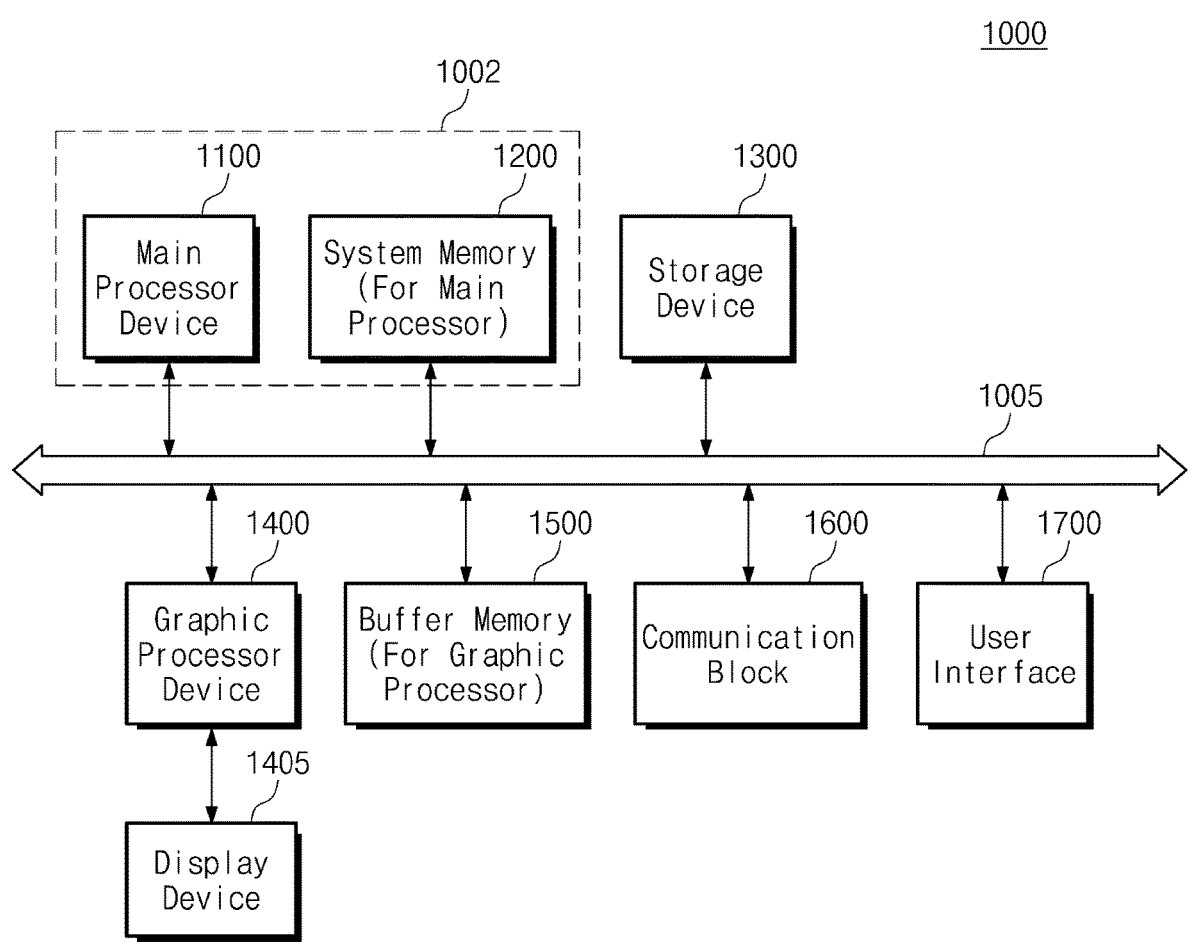
FIG. 1 is a block diagram illustrating an example configuration of an electronic system which includes processor devices according to some example embodiments.

FIG. 1 is a block diagram illustrating an example configuration of an electronic system 1000, which includes processor devices 1100 and 1400 according to some example embodiments.

The electronic system 1000 may include a main processor device 1100, a system memory 1200, a storage device 1300, a graphic processor device 1400, a display device 1405, a buffer memory 1500, a communication block 1600, a user interface 1700, and a bus 1005. For example, the electronic system 1000 may be one of a desktop computer, a laptop computer, a tablet computer, a smart phone, a wearable device, an electric vehicle, a home appliance, and/or the like.

The main processor 1100 may perform various logical/arithmetic operations to control overall operations of the electronic system 1000. For example, the main processor device 1100 may include an electronic circuit such as a field programmable gate array (FPGA) or application specific integrated circuits (ASICs). For example, the main processor device 1100 may include one or more processor cores, and may be implemented with a general-purpose processor or an application processor.

The system memory 1200 may store data processed or to be processed by the main processor device 1100. For example, the system memory 1200 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1300 may store data regardless of whether or not power is supplied. For example, the storage device 1300 may include a storage medium such as a solid state drive (SSD), a card storage, an embedded storage, and/or the like.

The graphic processor device 1400 may be configured to process specific types of operations. For example, the graphic processor device 1400 may process operations specific to graphic processing to display image information on the display device 1405. For example, the graphic processor device 1400 may perform operations specialized for graphic processing by using parallel processors for processing a large amount of graphic data rapidly. The graphic processor device 1400 may include electronic circuits, such as an FPGA, ASICs, a fixed/reconfigurable logic circuit, and/or the like, to perform operations.

The display device 1405 may provide a user with image information, based on an output of the graphic processor device 1400. For example, the display device 1405 may be implemented with an organic light emitting diode (OLED) display device, an active matrix OLED (AMOLED) display device, and/or the like.

The buffer memory 1500 may store data processed or to be processed by the graphic processor device 1400. For example, the buffer memory 1500 may include a volatile memory such as an SRAM, a DRAM, or an SDRAM, and/or a nonvolatile memory such as a PRAM, an MRAM, a ReRAM, or an FRAM.

In some example embodiments, as illustrated in FIG. 1, the graphic processor device 1400 may be separate from the main processor device 1100. For example, the main processor device 1100 may be a central processing unit (CPU), and the graphic processor device 1400 may be a graphic processing unit (GPU). For example, the graphic processor device 1400 and the buffer memory 1500 may be implemented with one graphic card module.

In some example embodiments, unlike the example illustrated in FIG. 1, the graphic processor device 1400 may be implemented as one chip or module together with the main processor device 1100. For example, an application processor may be implemented with a system on chip (SoC), and may include configurations of both the main processor device 1100 and the graphic processor device 1400.

In some example embodiments, as illustrated in FIG. 1, the buffer memory 1500 may be separate from the system memory 1200. In other example embodiments, unlike the example illustrated in FIG. 1, the buffer memory 1500 may be implemented with one memory together with the system memory 1200, and this one memory may be shared by the main processor device 1100 and the graphic processor device 1400.

As such, a configuration of the electronic system 1000 may be variously changed or modified. The example configuration of FIG. 1 is provided to facilitate better understanding, and is not intended to be limiting.

The communication block 1600 may support at least one of various wireless communication protocols and/or various wired communication protocols to communicate with an external device/system of the electronic system 1000. The user interface 1700 may include various input interfaces and various output interfaces to facilitate communication between the user and the electronic system 1000.

The bus 1005 may provide a communication path between components of the electronic system 1000. The components of the electronic system 1000 may exchange data with one another in compliance with a bus format of the bus 1005. For example, the bus format may include one or more of various interface protocols such as universal serial bus (USB), small computer system interface (SCSI), peripheral component interconnect express (PCIe), mobile PCIe (M-PCIe), serial advanced technology attachment (SATA), serial attached SCSI (SAS), and/or the like.

The main processor device 1100 and the system memory 1200 may constitute a host system 1002. The host system 1002 may access other components of the electronic system 1000 through the bus 1005. For example, using the bus 1005, the host system 1002 may communicate with the graphic processor device 1400 and/or may access the buffer memory 1500 such that the display device 1405 displays image information. In this example, the graphic processor device 1400 may be understood as a slave device of the host system 1002.

The main processor device 1100 and the graphic processor device 1400 may be implemented according to example embodiments of the present disclosure. Example configurations and example operations associated with the main processor device 1100 and the graphic processor device 1400 will be described with reference to FIGS. 2 to 20.

Example embodiments associated with the main processor device 1100 and the graphic processor device 1400 are provided in the following descriptions, but the embodiments are not limited thereto. It may be readily understood that the example embodiments are employed in any type of processor device, whether developed now or to be developed in the future. The following descriptions are provided to facilitate better understanding, and are not intended to be limiting.

Figure 2:
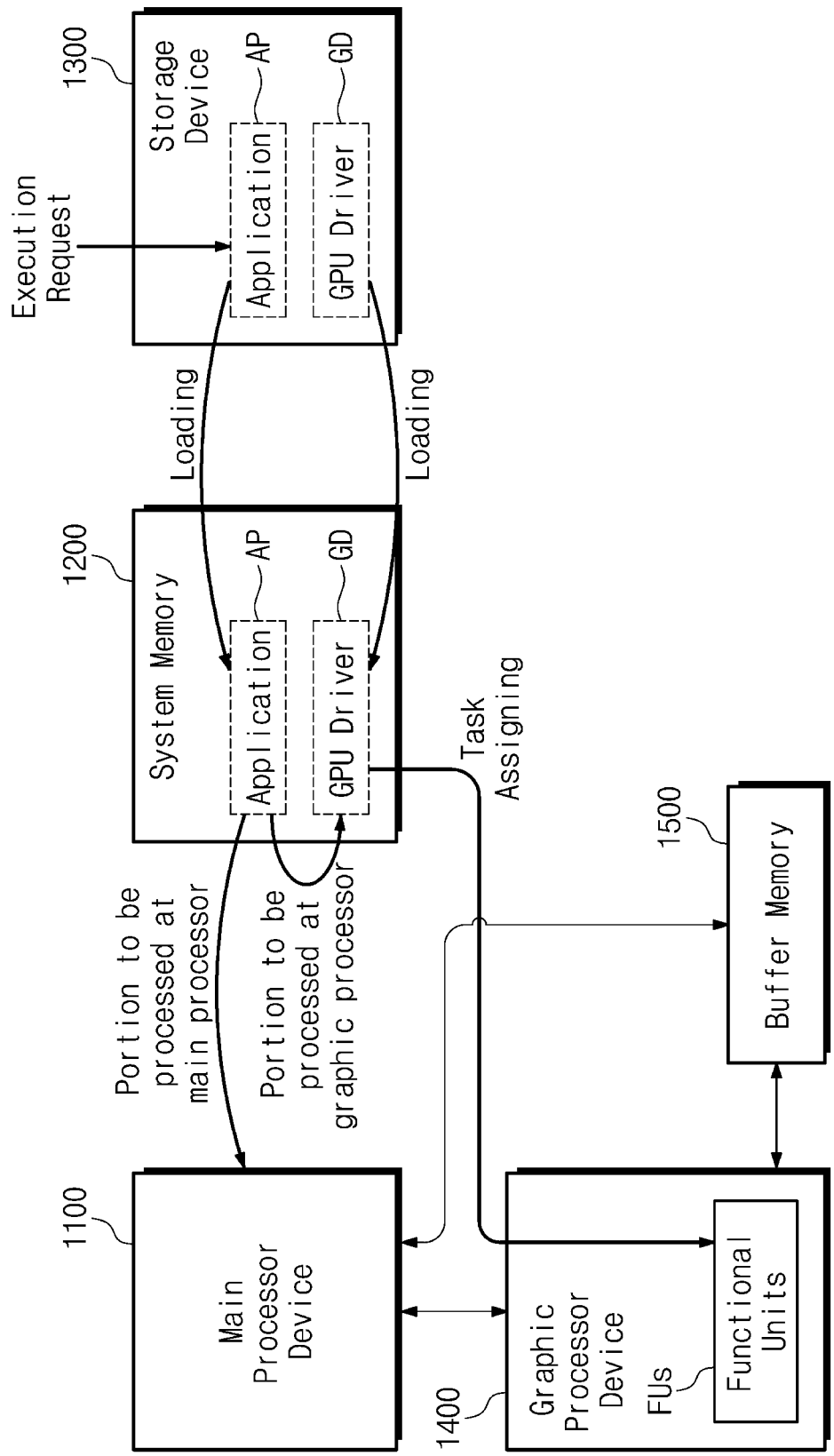
FIG. 2 is a conceptual diagram illustrating example operations associated with processor devices of FIG. 1.

FIG. 2 is a conceptual diagram illustrating example operations associated with the processor devices 1100 and 1400 of FIG. 1.

The storage device 1300 may store data of an application AP and data of a GPU driver GD. The application AP may be software and/or firmware which causes the electronic system 1000 to perform operations defined by program codes of the application AP to provide a service to the user. For example, the application AP may include an operating system and/or a user application (e.g., a multimedia playing application, a video game application, etc.). As used herein, the term "program code(s)" may refer to instructions written in a programming language (e.g., source code), which may be converted into machine language for execution by a computer (e.g., machine or executable code).

The user may be an end-user of the electronic system 1000. Alternatively, the user may be a designer of the electronic system 1000 or the processor devices 1100 and 1400, or may be a developer of the application AP.

The GPU driver GD may be software and/or firmware configured to operate or control the graphic processor device 1400. The GPU driver GD may provide a hardware component (e.g., the main processor device 1100) of the electronic system 1000 with interfacing to the graphic processor device 1400, and may allow the application AP to access hardware functions of the graphic processor device 1400.

For example, a request for executing the application AP may be provided to the GPU driver GD for the graphic processor device 1400. The request may be received from the user through the user interface 1700, or the request may be generated within the electronic system 1000, e.g., in response to a specific condition being satisfied. The data of the application AP may be loaded to the system memory 1200 in response to the request received by the GPU driver GD.

The data of the GPU driver GD may also be loaded to the system memory 1200. The data of the GPU driver GD may be loaded when an operation of the electronic system 1000 is initiated (e.g., when the electronic system 1000 is booted up), or may be loaded when interfacing with the graphic processor device 1400 is required.

As the data of the GPU driver GD is loaded to the system memory 1200, the main processor device 1100 may process an instruction set directed by program codes of the GPU driver GD. Accordingly, the GPU driver GD may be executed on the host system 1002 according to operations of the main processor device 1100.

For example, the program codes of the application AP may include a portion configured to use the hardware functions of the graphic processor device 1400. This portion may be processed at the graphic processor device 1400. To this end, the portion to be processed at the graphic processor device 1400 may be provided to the GPU driver GD.

The GPU driver GD may assign a task to the graphic processor device 1400, based on the portion of the program codes to be processed at the graphic processor device 1400 among the program codes of the application AP. The task may indicate a workload to be performed using hardware functions which are provided by the graphic processor device 1400.

The graphic processor device 1400 may include one or more functional units FUs. The functional units FUs may be configured to process a task assigned from the GPU driver GD. To this end, each of the functional units FUs may include one or more processor cores and/or one or more logic circuits. The logic circuits may be fixed, programmable, and/or reconfigurable. Herein, functional units FUs may also be referred to as processor circuits or processor units.

For example, the functional units FUs may include a primitive assembler for constructing primitives based on vertex data, a rasterizer for generating fragment data and coverage data based on the primitives, a shader core for processing an instruction set directed by a shader program, a special operation unit for performing special functions (e.g., triangle copy, pixel blending, and/or the like), and/or the like. For example, the functional units FUs may provide a function of a general-purpose computing on GPU (GPGPU).

However, the above examples are provided to facilitate better understanding, and are not intended to be limiting. The functional units FUs may include various types of functional units to perform operations associated with graphic processing. The functional units FUs may return results of processing the task to the GPU driver GD. Accordingly, the program code portion of the application AP which requires the hardware functions of the graphic processor device 1400 may be processed.

For example, the main processor device 1100 may control the graphic processor device 1400 such that the graphic processor device 1400 performs operations. The buffer memory 1500 may store operation results (e.g., results of processing a task) generated by the graphic processor device 1400, and the main processor device 1100 may access the buffer memory 1500 to obtain the operation results. Accordingly, the operation results from the graphic processor device 1400 may be provided to the GPU driver GD.

For example, the program codes of the application AP may include a portion to be processed at the main processor device 1100. The portion of the program codes to be processed at the main processor device 1100 may direct and control a general arithmetic/logical operation which is not associated with graphic processing. Additionally or alternatively, the portion to be processed at the main processor device 1100 may direct an arithmetic/logical operation for generating texture data to be used in graphic processing of the graphic processor device 1400.

In this manner, the main processor device 1100 and the graphic processor device 1400 may perform and process operations defined by the program codes of the application AP. The application AP may provide the user with a service, based on a result of performing/processing operations.

Figure 3:
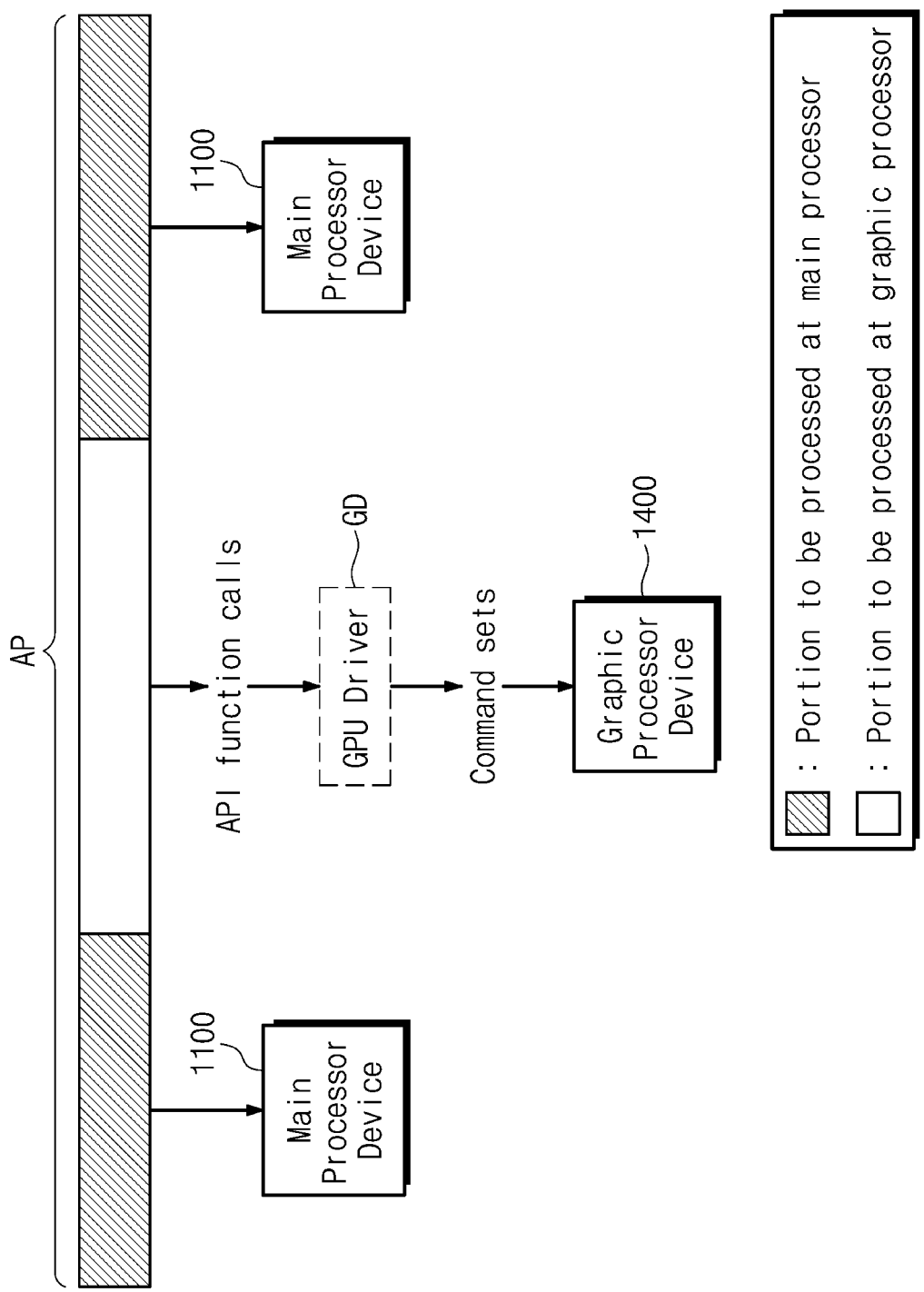
FIG. 3 is a conceptual diagram for describing example operations associated with processor devices of FIG. 1.

FIG. 3 is a conceptual diagram for describing example operations associated with the processor devices 1100 and 1400 of FIG. 1.

The program codes of the application AP may include a portion to be processed at the main processor device 1100 and a portion to be processed at the graphic processor device 1400. The main processor device 1100 may process operations which are required by the application AP, based on the program code portion to be processed at the main processor device 1100.

In some example embodiments, the program code portion to be processed at the graphic processor device 1400 may be written based on a graphics application programming interface (API). For example, the program code portion to be processed at the graphic processor device 1400 may be written based on an API library or framework such as Direct3D, OpenGL, EGL, OpenCL, and/or the like. In these example embodiments, as the application AP is executed, function calls may be generated from the program code portion to be processed at the graphic processor device 1400.

However, the above examples are provided to facilitate better understanding, and are not intended to be limiting. The program code portion to be processed at the graphic processor device 1400 may be written based on other type of library or framework, or may be written with general program codes without a specific library or framework. Regardless of a manner of writing a program code, a function, a method, or any other type of module block may be called as the application AP is executed.

Function calls may be input to the GPU driver GD. The GPU driver GD may convert the function calls to command sets. A command set may be of machine instructions, and may be generated by changing the function calls to a format which can be processed and recognizable by the graphic processor device 1400. For example, the graphic processor device 1400 cannot directly process the function calls, and may understand and process a command set prepared by the GPU driver GD.

The graphic processor device 1400 may receive the command sets (e.g., through the bus 1005), and may process operations directed by the received command sets. For example, in response to each received command set, the graphics processor device 1400 may perform operations included in and commanded by the received command set. As such, the graphic processor device 1400 may perform operations corresponding to the portion of program codes to be processed at the graphic processor device 1400 among the program codes of the application AP.

FIG. 4 is a conceptual diagram for describing an example relationship between a function call and a command set with regard to the example operations of FIG. 3.

For example, M function calls may constitute one function call group. For example, first to M-th function calls may constitute a first function call group (e.g., API function call group 1). Similarly, the second to N-th function call groups may be constituted including several individual function calls. However, in some examples, the number of function calls constituting each of the function call groups may be different from one another.

For example, one function call group may be converted to one command set. For example, a first command set may be generated based on function calls of the first function call group, and a second command set may be generated based on the second function call group. One function call group may include function calls which may constitute one command set. As shown in the example of FIG. 4, command set 1 may be generated based on API function call group 1, command set 2 may be generated based on API function call group 2, command set 3 may be generated based on API function call group 3, command set (N−1) may be generated based on API function call group (N−1), and command set N may be generated based on API function call group N.

One command set may be configured in one packet unit or in one batch unit. One command set may correspond to one unit that is input to a command queue (e.g., a command queue CQ of FIG. 6) and is managed at the command queue.

Commands included in one command set may be together input to the command queue, and may be successively processed together in one processing interval. For example, commands (e.g., machine instructions) included in the first command set may be successively processed in a first single processing interval, and commands included in the second command set may be successively processed in a second single processing interval.

FIG. 5 is a conceptual diagram for describing an example method of collecting performance information with regard to operations of the graphic processor device 1400 of FIG. 1.

Various events may occur while the graphic processor device 1400 processes operations directed by command sets with regard to function calls. Events may be actions or occurrences detected by a program. For example, the events may include hardware-related states such as cache miss (i.e., a state where required data is not stored in a cache memory), bus collision (i.e., a state where collision occurs between data paths through a bus), a processing-idle state (i.e., a state where a specific functional unit or processor is idle without operation processing), and/or the like.

For example, the events may include graphics-related states such as a vertex count (i.e., the number of input or output vertexes associated with a specific functional unit), a primitive count (i.e., the number of input or output primitives associated with a specific functional unit), and/or the like. However, the above examples are provided to facilitate better understanding, and are not intended to be limiting. The events may include various states which occur while the graphic processor device 1400 processes operations.

The events may affect operation performance and an operation characteristic of the graphic processor device 1400. For example, frequent cache misses may degrade the operation performance. Accordingly, collecting performance information (e.g., information associated with which event(s) occurs while the graphic processor device 1400 performs operations and how many times each event occurs) may be advantageous to analyze and improve performance and characteristics of the application AP and the graphic processor device 1400.

For example, the collected performance information may be referenced to analyze the cause of bottleneck of operations required by the application AP and to optimize program codes of the application AP. For example, the collected performance information may be referenced to debug an error or exception which occurs while operations required by the application AP are performed.

As such, the collected performance information may be variously used to improve a service that the application AP provides. For example, the electronic system 1000 may automatically perform an analysis/improvement job based on the collected performance information. For example, the electronic system 1000 may store the collected performance information in a form of a file or a database (e.g., in the storage device 1300), or may output the collected performance information to the user through the display device 1405 or the user interface 1700. The user may manually perform an analysis/improvement job with reference to the collected performance information.

Collecting performance information and performing an analysis/improvement job may be referred to as performance profiling. The performance profiling may be performed on all or some of a portion of the program codes to be processed at the graphic processor device 1400 among the program codes of the application AP. For example, the user may select a start point and an end point of a portion of the program codes targeted for the performance profiling. In this example, the performance profiling may be performed with regard to function calls which correspond to a performance profiling target between the start point and the end point. For example, in FIG. 5, the performance profiling is performed on the function calls constituting the second to (N-1)-th function call groups (e.g., API function call group 2, API function call group 3, through API function call group (N-1)).

Alternatively, the user may designate a target of performance profiling by a frame unit to be obtained as a result of rendering.

Figure 6:
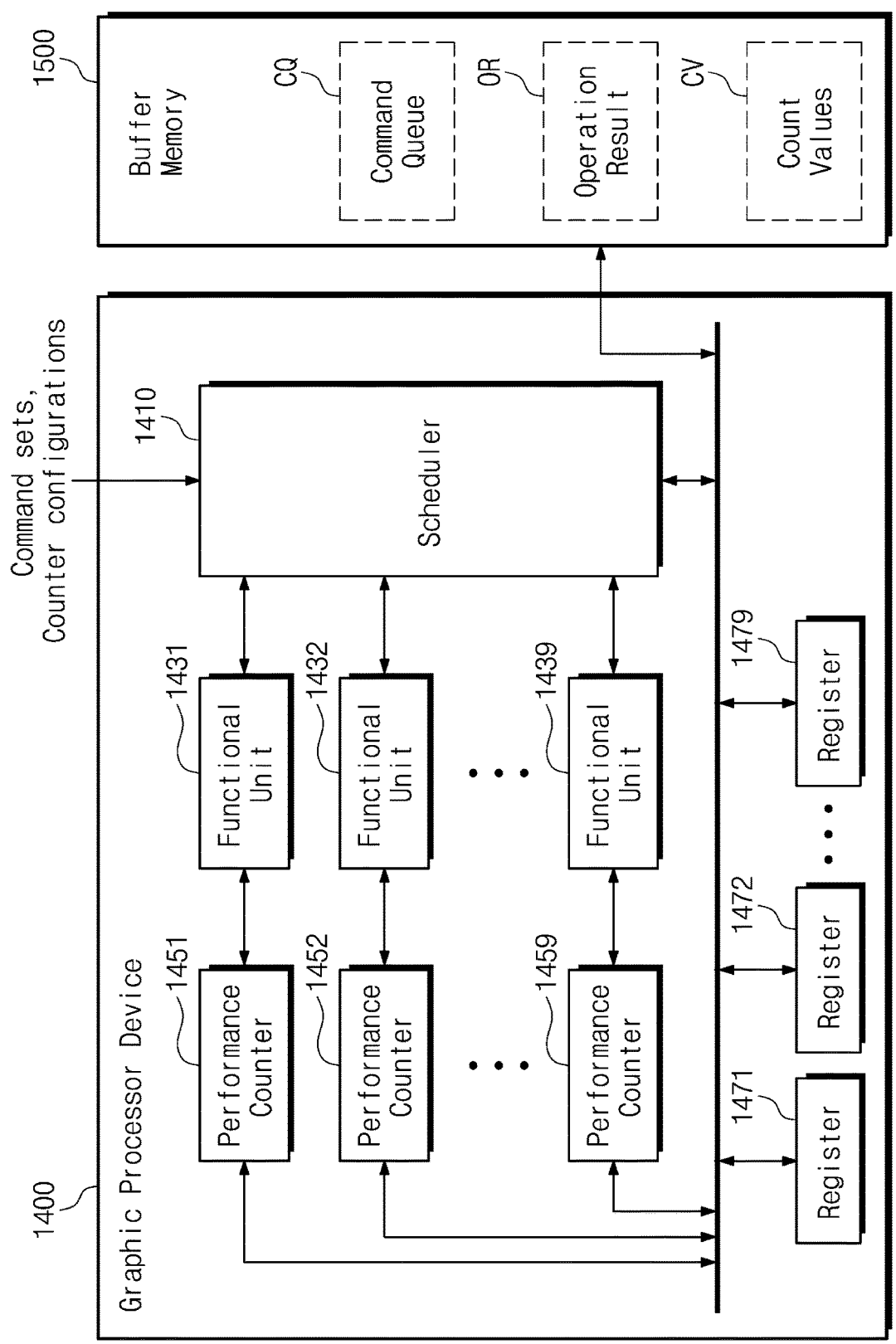
FIG. 6 is a block diagram illustrating an example configuration associated with a graphic processor device of FIG. 1.

FIG. 6 is a block diagram illustrating an example configuration associated with the graphic processor device 1400 of FIG. 1.

In some example embodiments, the graphic processor device 1400 may include a scheduler 1410, functional units 1431 to 1439, performance counters 1451 to 1459, and registers 1471 to 1479. However, unlike illustration of FIG. 6, a configuration of the graphic processor device 1400 may be variously changed or modified. The graphic processor device 1400 may further include component(s) not illustrated in FIG. 6, or may not include one or more of components illustrated in FIG. 6.

The scheduler 1410 may receive command sets from the GPU driver GD. The scheduler 1410 may manage commands of the received command sets in a command queue CQ. The command queue CQ may be allocated in a memory area on the buffer memory 1500 to manage commands for each command set.

The functional units 1431 to 1439 may correspond to the functional units FUs of FIG. 2. The functional units 1431 to 1439 may process tasks assigned from the GPU driver GD. To this end, the scheduler 1410 may schedule commands (e.g., may arrange the order of processing commands or may establish a relationship between commands received from the GPU driver GD), and thus the functional units 1431 to 1439 may perform and process operations directed by each of the command sets.

Operation results OR from the functional units 1431 to 1439 may be stored in the buffer memory 1500. The main processor device 1100 may access the buffer memory 1500 to obtain the operation results OR.

The performance counters 1451 to 1459 may count the numbers of times where events respectively occur while the functional units 1431 to 1439 process operations. For example, the performance counters 1451 to 1459 may count the number of times where cache misses occur while operations directed by the command sets are processed. In this manner, performance information may be collected.

In some cases, the user or the electronic system 1000 may be interested in occurrence of a specific event among various events. For example, the user or the electronic system 1000 may be interested in events which cause degradation of performance, such as cache miss and a processing-idle state. The specific event may be referred to as an event of interest. Collecting the performance information may be performed on all events, or may be performed on some events (e.g., events of interest).

For example, information associated with counter configurations may be received at the scheduler 1410. For example, the counter configuration information may be received from the user through the user interface 1700, or may be generated in the electronic system 1000.

For example, the counter configuration information may be used to set configurations (e.g., setting values, operation conditions, and/or the like) of the performance counters 1451 to 1459 which are used to collect the performance information associated with events of interest. For example, when the event of interest includes cache misses, the counter configuration information may be used to set configurations of the performance counters 1451 to 1459 to be suitable to count the number of times where cache misses occur with regard to the functional units 1431 to 1439.

The scheduler 1410 may set configurations of the performance counters 1451 to 1459 based on the counter configuration information, such that the performance counters 1451 to 1459 count the numbers of times for the events of interest. Based on the setting of the scheduler 1410, the performance counters 1451 to 1459 may count the numbers of times where the events of interest respectively occur with regard to processing operations directed by each of command sets.

FIG. 6 illustrates an example configuration in which the performance counters 1451 to 1459 correspond to the functional units 1431 to 1439 respectively. In this configuration, the performance counters 1451 to 1459 may count the numbers of times for the events of interest with regard to operations processed by the respective functional units 1431 to 1439.

However, the embodiments are not limited to the illustration of FIG. 6. In some example embodiments, unlike illustration of FIG. 6, a configuration of the graphic processor device 1400 may be changed or modified in such a way that one performance counter corresponds to a plurality of functional units or a plurality of performance counters corresponds to one functional unit.

The registers 1471 to 1479 may store count values. A count value may correspond to the number of times counted by a respective one of the performance counters 1451 to 1459. For example, while the functional units 1431 to 1439 process operations, the performance counters 1451 to 1459 may change or update the count values stored in the registers 1471 to 1479, based on the counted numbers of times.

For example, when the functional units 1431 to 1439 complete processing operations, count values CV that have been stored in the registers 1471 to 1479 may be stored in the buffer memory 1500. For example, the main processor device 1100 may access the buffer memory 1500 to obtain the count values CV. The count values CV may be collected as the performance information, and the performance profiling may be performed based on the count values CV.

Figure 7:
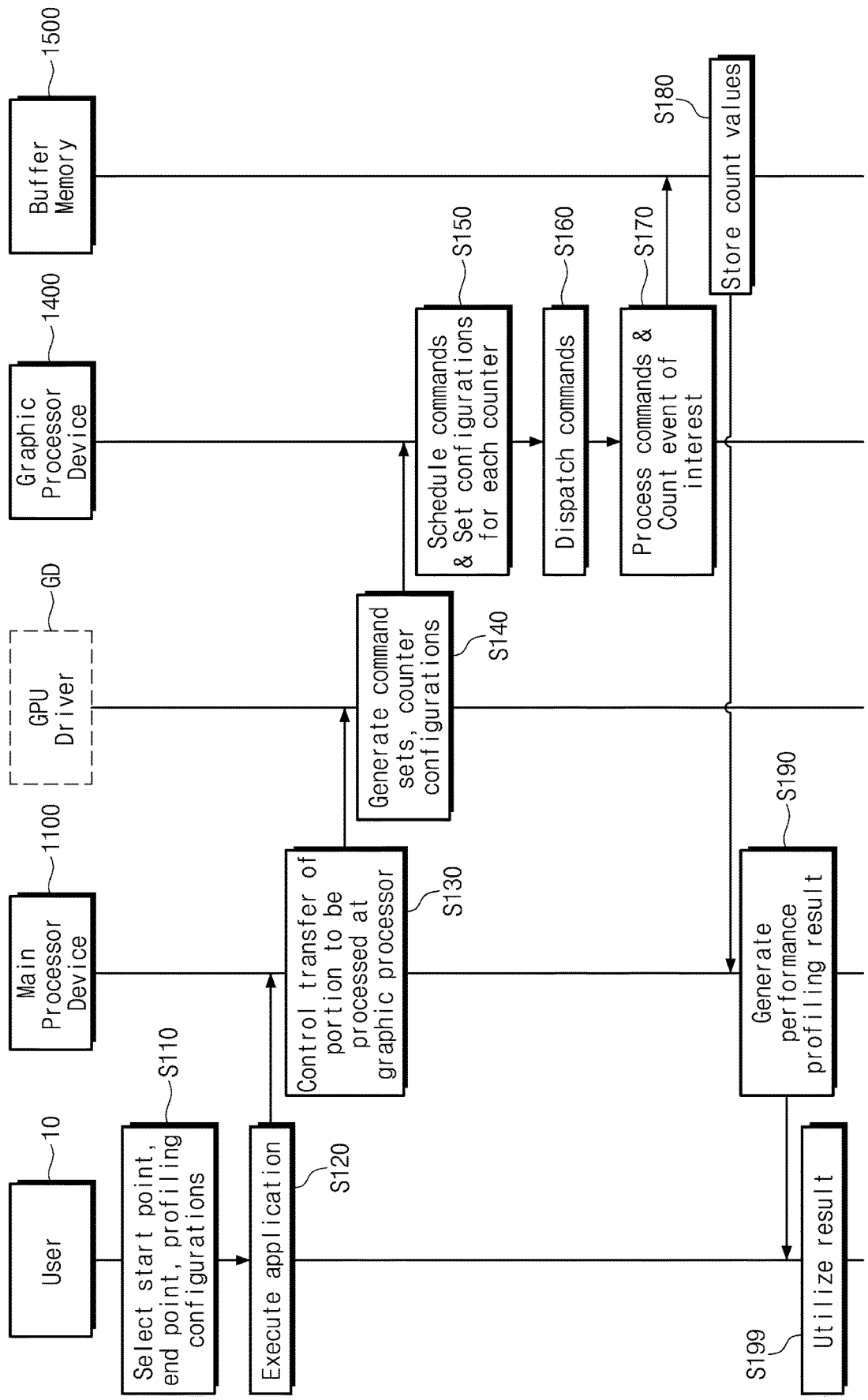
FIG. 7 is a flowchart describing an example method of collecting performance information with regard to operations of a graphic processor device of FIG. 6.

FIG. 7 is a flowchart describing an example method of collecting performance information with regard to operations of the graphic processor device 1400 of FIG. 6.

For example, a user 10 may select a start point and an end point of performance profiling, and may select profiling configurations in some cases (S110). For example, the user 10 may input information of the start point, the end point, and the profiling configurations to the electronic system 1000 through the user interface 1700.

The profiling configurations may include a variety of information associated with a condition of performance profiling. For example, the profiling configurations may include information associated with events of interest. As the user 10 inputs the profiling configurations, the performance profiling may be provided with regard to the events of interest.

For example, the user 10 may request execution of the application AP (S120). The main processor device 1100 may respond to the requested execution. Under control of the main processor device 1100, the data of the application AP may be loaded to the system memory 1200, and operations defined by the program codes of the application AP may be performed and processed. In some example embodiments, operation S110 and operation S120 may be triggered inside the electronic system 1000 in response to a specific condition being satisfied.

The main processor device 1100 may control transfer of the portion of program codes to be processed at the graphic processor device 1400 among the program codes of the application AP (S130). Under control of the main processor device 1100, the GPU driver GD may generate command sets based on function calls which are generated according to the execution of the application AP, and may also generate counter configuration information based on the profiling configurations (S140).

In the graphic processor device 1400, the scheduler 1410 may receive the command sets and the counter configuration information. The scheduler 1410 may schedule commands of the command sets, and may set configurations of the performance counters 1451 to 1459 (S150). In addition, the scheduler 1410 may dispatch the commands to functional units 1431 to 1439 (S160).

Accordingly, the functional units 1431 to 1439 may process operations directed by the commands, by a command set unit. For example, the commands of a given command set unit may be processed by one functional unit 1431 to 1439. The performance counters 1451 to 1459 may count the numbers of times where the events of interest respectively occur while operations are processed (S170). For example, each performance counter 1451 to 1459 may count a number of times that a corresponding event of interest occurs while the operations are processed. The calculated numbers of times may be temporarily stored in the registers 1471 to 1479, and the count values CV may be stored in the buffer memory 1500 after the operation processing is completed (S180).

The main processor device 1100 may generate performance information or a performance profiling result, based on the count values CV stored in the buffer memory 1500 (S190). For example, the performance information or the performance profiling result may be stored in the storage device 1300 including numerical statistical information, or may be output in a form of a graph or a table. For example, the user 10 may utilize the performance information or the performance profiling result to analyze and improve the application AP (S199).

Figure 8:
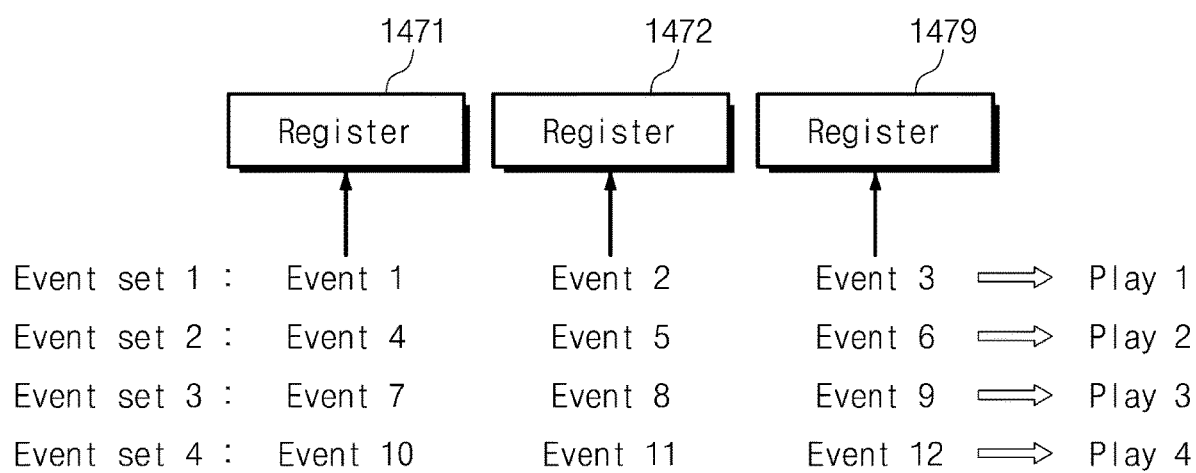
FIG. 8 is a conceptual diagram for describing a replay for collecting performance information corresponding to events of which the number is greater than the number of registers of FIG. 6.

FIG. 8 is a conceptual diagram for describing a replay for collecting performance information corresponding to events of which the number is greater than the number of the registers 1471, 1472, and 1479 of FIG. 6.

To facilitate better understanding, it will be assumed that the graphic processor device 1400 includes three (3) registers 1471, 1472, and 1479. Each of the registers 1471, 1472, and 1479 may store a value corresponding to the number of times one event is counted.

In some cases, the number of events of interest may be greater than the number of the registers 1471, 1472, and 1479. For example, the user 10 or the electronic system 1000 may be interested in twelve (12) events. For example, first, second, and third events may constitute a first event set. Similarly, fourth to twelfth events may constitute second to fourth event sets. However, the number of registers and the number of events of interest may be variously changed or modified, and the present invention is not limited to examples described in the present disclosure.

Meanwhile, the three registers 1471, 1472, and 1479 may store the numbers of times which are counted for three events of interest, and may not be able to store the numbers of times which are counted for all the twelve events of interest. In this case, to count the numbers of times where all the twelve events of interest respectively occur, operations directed by the program codes of the application AP may be repeated four times between a start point and an end point.

For example, a first play may be provided such that the numbers of times for the first, second, and third events are counted. Herein, a play may mean performing and processing operations directed by the program codes of the application AP (i.e., directed by command sets) within a single specific interval (e.g., an interval between the start point and the end point). While the first play is performed, performance information may be collected with regard to the first, second, and third events. Similarly, second to fourth plays may be provided to count the numbers of times for the fourth to twelfth events. For example, a second play may be performed to collect performance information for the fourth, fifth, and six events, a third play may be performed to collect performance information for the seventh, eighth, and ninth events, and a fourth play may be performed to collect performance information for the tenth, eleventh, and twelfth events.

Thus, when the number of events of interest is greater than the number of registers, operations directed by the program codes of the application AP may be replayed to collect performance information with regard to all the events of interest. Herein, a replay may mean that the same play is repeatedly performed multiple times.

However, for each repetition of operations directed by each of the command sets (i.e., for each play), the numbers of times for different events of interest may be counted. For example, the numbers of times for the first, second, and third events may be counted with regard to the first play, and the numbers of times for the fourth, fifth, and sixth events may be counted with regard to the second play. One play may be performed with regard to one event set.

When the number of registers increases, the number of times where a play is repeated may decrease and efficiency of a replay may be improved. However, when the number of registers increases, costs of manufacturing the graphic processor device 1400 and a size of the graphic processor device 1400 may also increase. Accordingly, the graphic processor device 1400 may include the limited number of registers 1471, 1472, and 1479.

Figure 9:
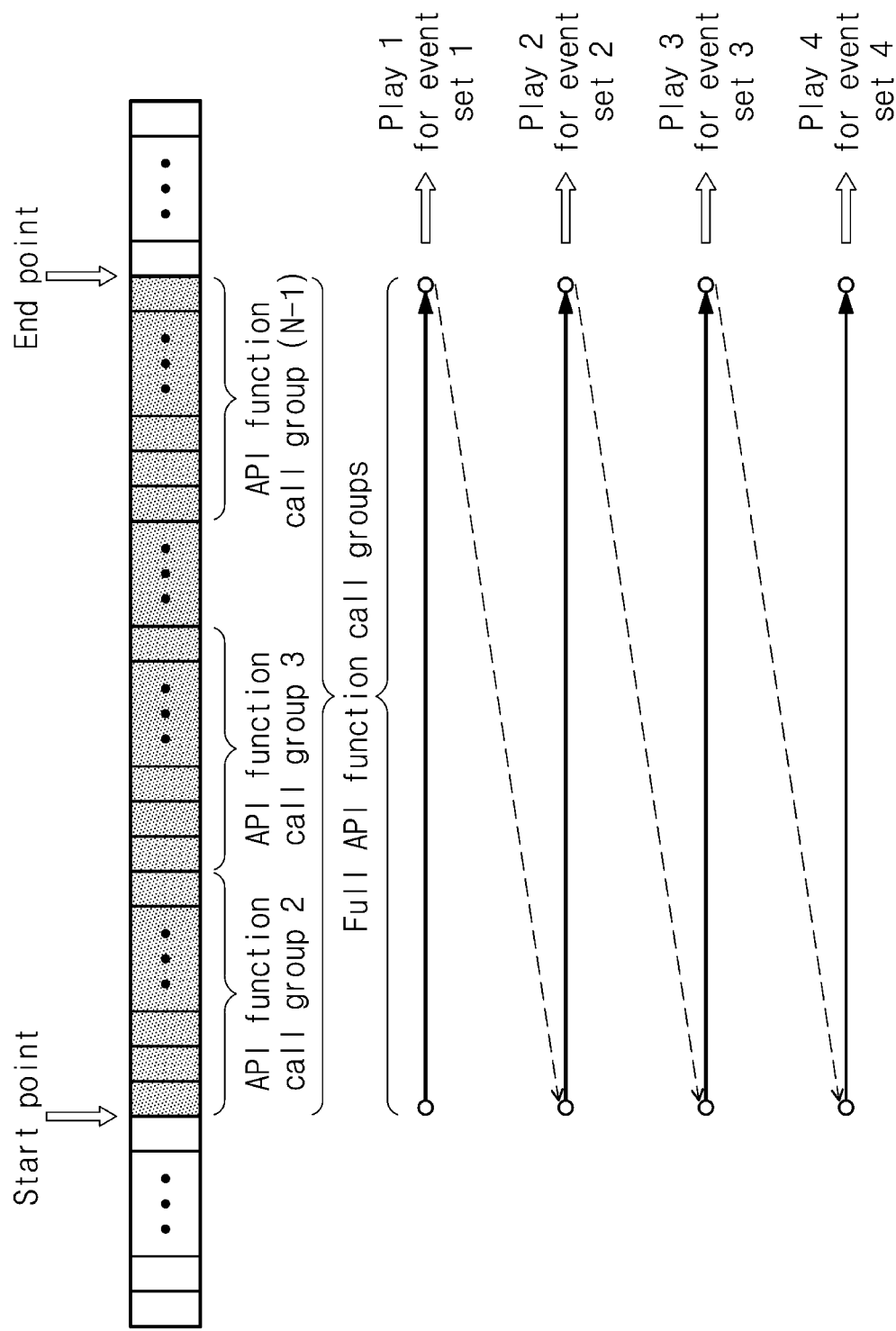
FIG. 9 is a conceptual diagram for describing an example replay with regard to operations of a graphic processor device of FIG. 6.

FIG. 9 is a conceptual diagram for describing an example replay with regard to operations of the graphic processor device 1400 of FIG. 6.

For example, performance information may be collected with regard to function calls of a second function call group (e.g., API function call group 2) to a (N−1)-th function call group (e.g., API function call group (N−1)) between a start point and an end point. In some implementation, a replay may be performed based on full function call groups (e.g., API function call group 2 through API function call group (N−1)).

For example, the first play associated with the first event set may be performed to process operations corresponding to the full function call groups. During the first play (e.g., play 1), performance information may be collected with regard to the first, second, and third events (e.g., event set 1). After the first play is completed, the second play associated with the second event set may be performed to process the operations corresponding to the full function call groups. During the second play (e.g., play 2), performance information may be collected with regard to the fourth, fifth, and sixth events (e.g., event set 2).

Similarly, after the second play is completed, each of third and fourth plays may be performed based on the full function call groups. During the third and fourth plays (e.g., play 3 and play 4), performance information may be collected with regard to the seventh to twelfth events (e.g., event set 3 and event set 4).

Figure 10:
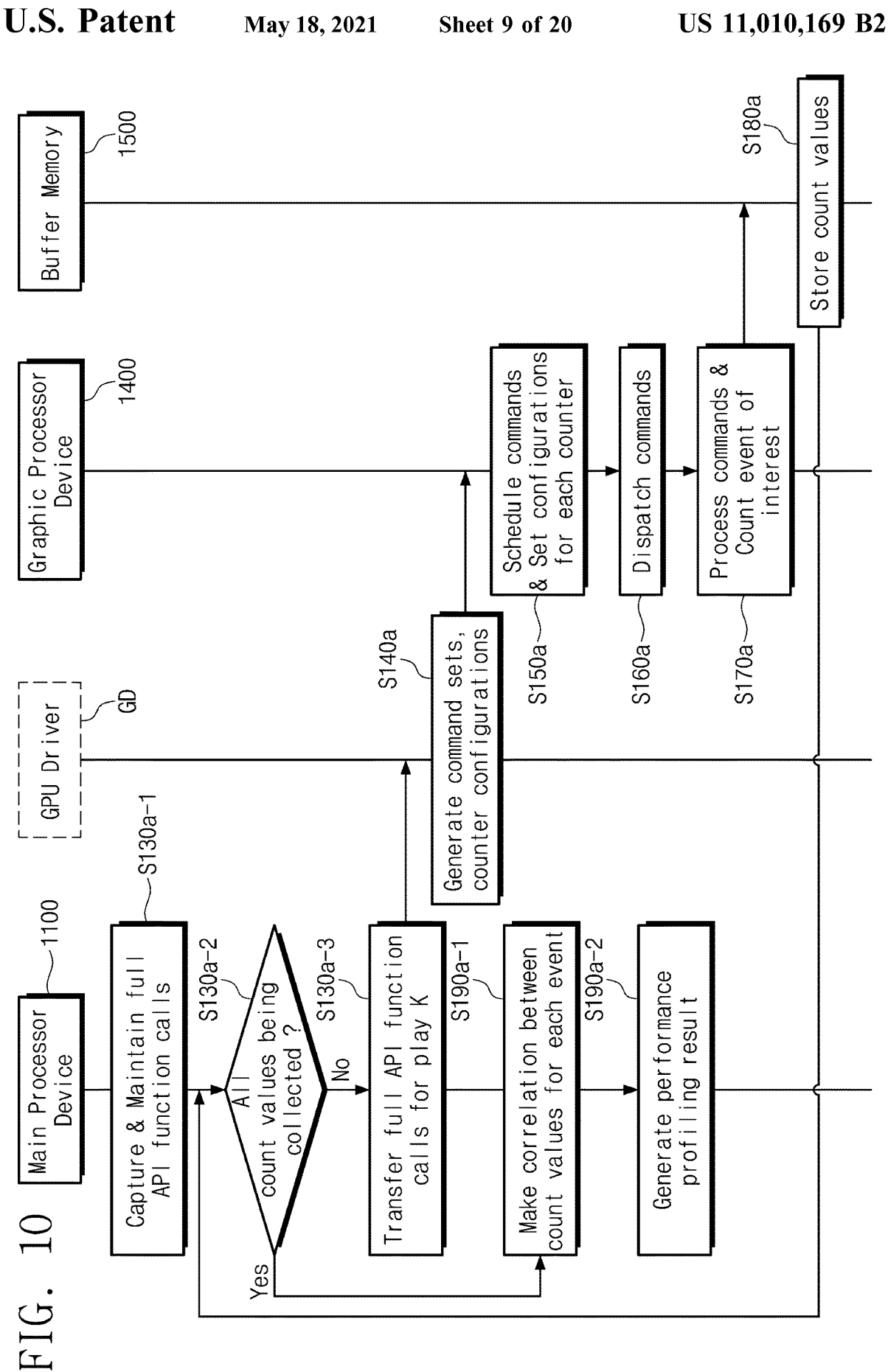
FIG. 10 is a flowchart describing an example method of collecting performance information through an example replay of FIG. 9.

FIG. 10 is a flowchart describing an example method of collecting performance information through the example replay of FIG. 9. For example, the example method of FIG. 10 may be performed after operation S110 and operation S120 of FIG. 7.

As the application AP is executed, the main processor device 1100 may capture function calls generated from the portion of the program codes to be processed at the graphic processor device 1400 among the program codes of the application AP. Herein, the capture may mean, for example, hooking a generated function call to recognize which function call is generated. The main processor device 1100 may retain (e.g., store) information of the captured function calls in the system memory 1200 (S130a-1).

The main processor device 1100 (or, in some example embodiments, the GPU driver GD or the graphic processor device 1400) may determine whether all count values are collected (S130a-2). If not, a replay may be performed with regard to count values which are not collected yet. Accordingly, if all count values are not collected (S130a-2, No), the main processor device 1100 may input full function calls for a K-th play to the GPU driver GD (S130a-3).

Accordingly, the program portion to be processed at the graphic processor device 1400 may be transferred. Meanwhile, transferring the function calls may accompany transferring information of profiling configurations. The GPU driver GD may generate command sets based on the full function calls, and may generate counter configuration information based on the profiling configurations (S140a).

Afterwards, in the graphic processor device 1400, the scheduler 1410 may schedule commands of the command sets, and may set configurations of the performance counters 1451 to 1459 based on the counter configuration information (S150a). The commands may be dispatched to the functional units 1431 to 1439 according to a result of the scheduling (S160a).

While the functional units 1431 to 1439 process operations directed by the commands, the performance counters 1451 to 1459 may count the numbers of times where the events of interest respectively occur (S170a). The counted numbers of times may be temporarily stored in the respective one of the registers 1471, 1472, and 1479, and count values CV may be stored in the buffer memory 1500 after the operation processing of the K-th play is completed (S180a).

Afterwards, the main processor device 1100 (or, in some example embodiments, the GPU driver GD or the graphic processor device 1400) may again determine whether all the count values are collected (S130a-2). If not, operation S130a-3 to operation S180a may be repeated. In the example of FIGS. 9 and 10, the replay may be based on the full function calls stored in the system memory 1200.

When all the count values are collected (S130a-2, Yes), the main processor device 1100 (or, in some example embodiments, the GPU driver GD or the graphic processor device 1400) may make correlation between the count values CV associated with the events of interest (S190a-1). Events of different event sets may be observed during different plays with respect to the same full function calls, and thus the main processor device 1100 (or, in some example embodiments, the GPU driver GD or the graphic processor device 1400) may correlate and match the count values CV one another with regard to various factors, such as timing, a cause-and-effect relationship, and/or the like, to obtain appropriate replay results and performance information. The main processor device 1100 may generate performance information or a performance profiling result, based on the count values CV and the correlation (S190a-2).

Figure 11:
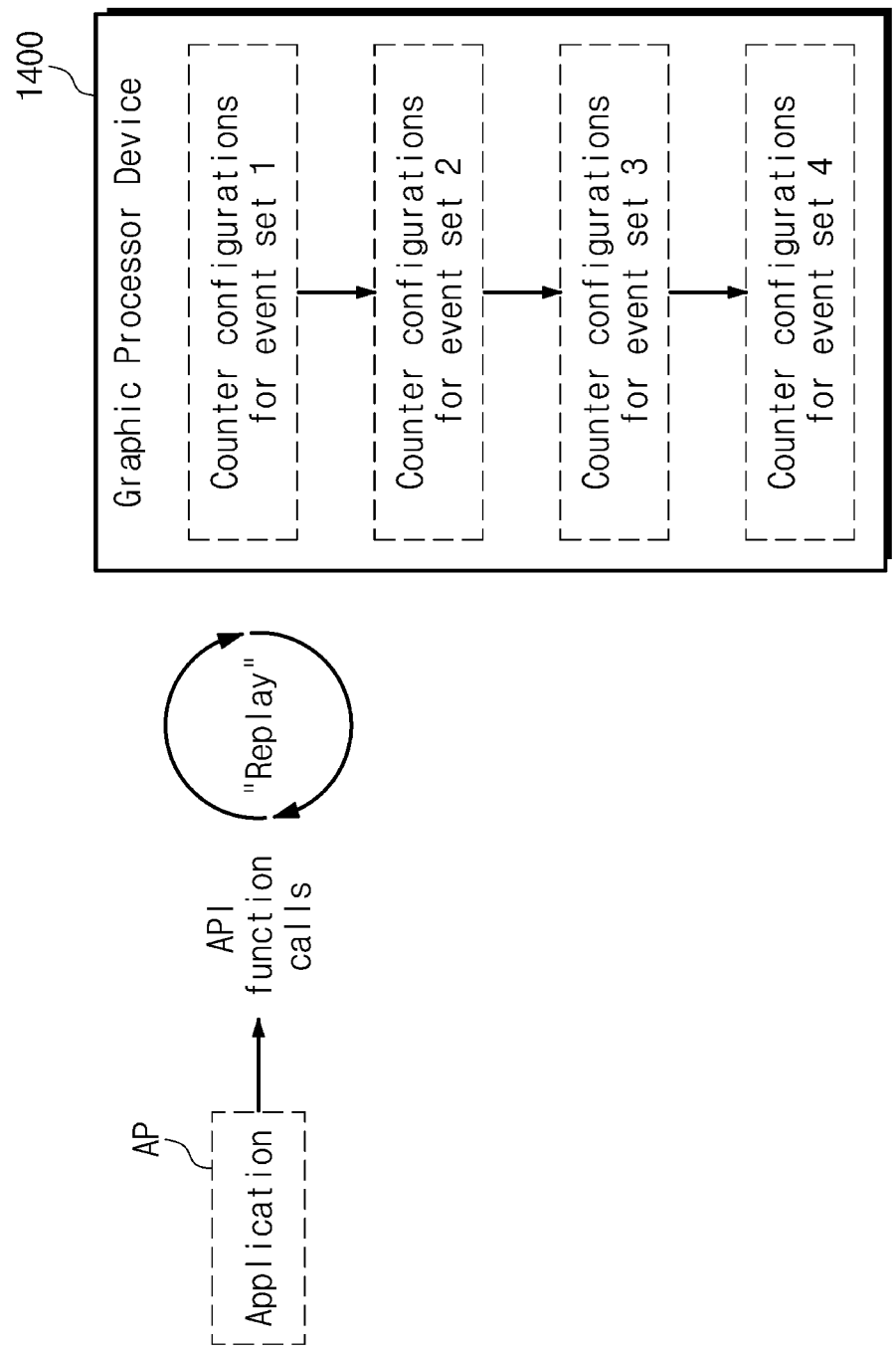
FIG. 11 is a conceptual diagram for describing an example replay of FIGS. 9 and 10.

FIG. 11 is a conceptual diagram for describing the example replay of FIGS. 9 and 10.

In the example of FIGS. 9 and 10, the replay may be based on the full function call groups that are generated based on the program codes of the application AP. To observe different events for each play, configurations of the performance counters 1451 to 1459 may be changed for each repetition.

For example, with regard to the first play, configurations of the performance counters 1451 to 1459 may be set to observe events of interest of the first event set. Afterwards, with regard to the second play, the configurations of the performance counters 1451 to 1459 may be set to observe events of interest of the second event set. In such a manner, with regard to the third and fourth plays, the configurations of the performance counters 1451 to 1459 may be set to observe events of interest of the third and fourth event sets, respectively.

With regard to the example of FIGS. 9 and 10, the system memory 1200 may maintain information of the full function call groups, and the GPU driver GD may convert the full function call groups to command sets for each play. Accordingly, a memory area of a large capacity may be used on the system memory 1200 for the replay. Further, converting the full function call groups and transferring the command sets to the graphic processor device 1400 for each and every play may degrade efficiency of performance profiling.

Moreover, a function call may accompany an argument or parameter used in operations directed by each function. Not only maintaining information of function call groups but maintaining information of arguments or parameters may also use a memory area of a large capacity on the system memory 1200. For example, when an argument or parameter includes graphics data (e.g., texture data), the replay may use a memory area of a considerably large capacity. When a large amount of memory area of the system memory 1200 is allocated for the replay, processing other operations may be delayed.

In some cases, when the electronic system 1000 is implemented with a mobile or portable device, the system memory 1200 may have a small capacity. In this case, the system memory 1200 may not be able to store a large amount of information, and a length of a function call interval targeted for performance profiling may be shortened. Accordingly, it may be difficult to collect sufficient performance information.

In addition, the GPU driver GD may newly generate command sets for each play. In this case, different command sets may be generated for each play, depending on runtime status and a non-deterministic characteristic of the main processor device 1100. For example, the order of scheduling commands may change, or a cause-and-effect relationship between commands may change. In this case, it may be difficult to make correlation between count values, or the correlation between the count values may not be accurate.

Figure 12:
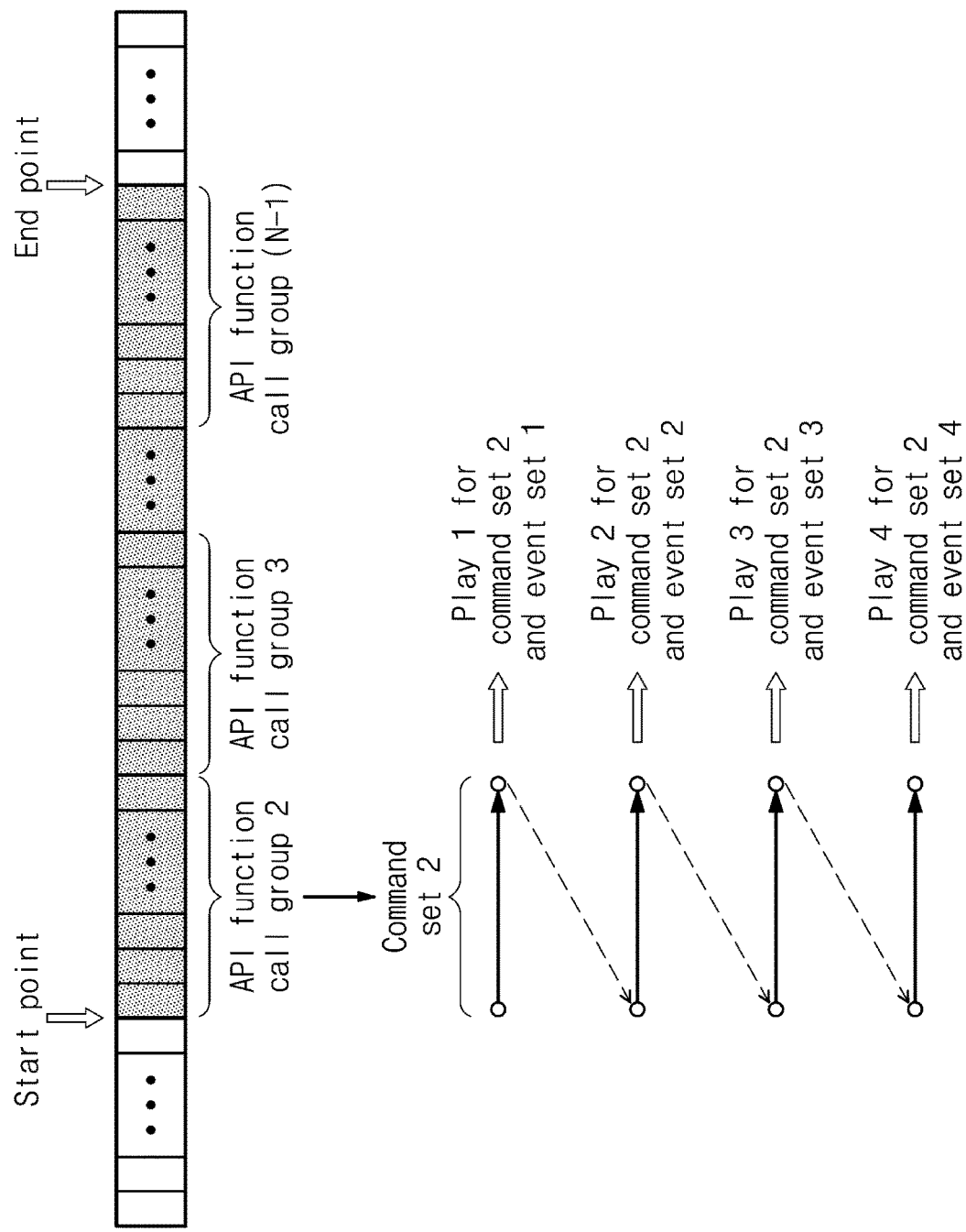
FIGS. 12 to 14 are conceptual diagrams for describing an example replay with regard to operations of a graphic processor device of FIG. 6.
Figure 13:
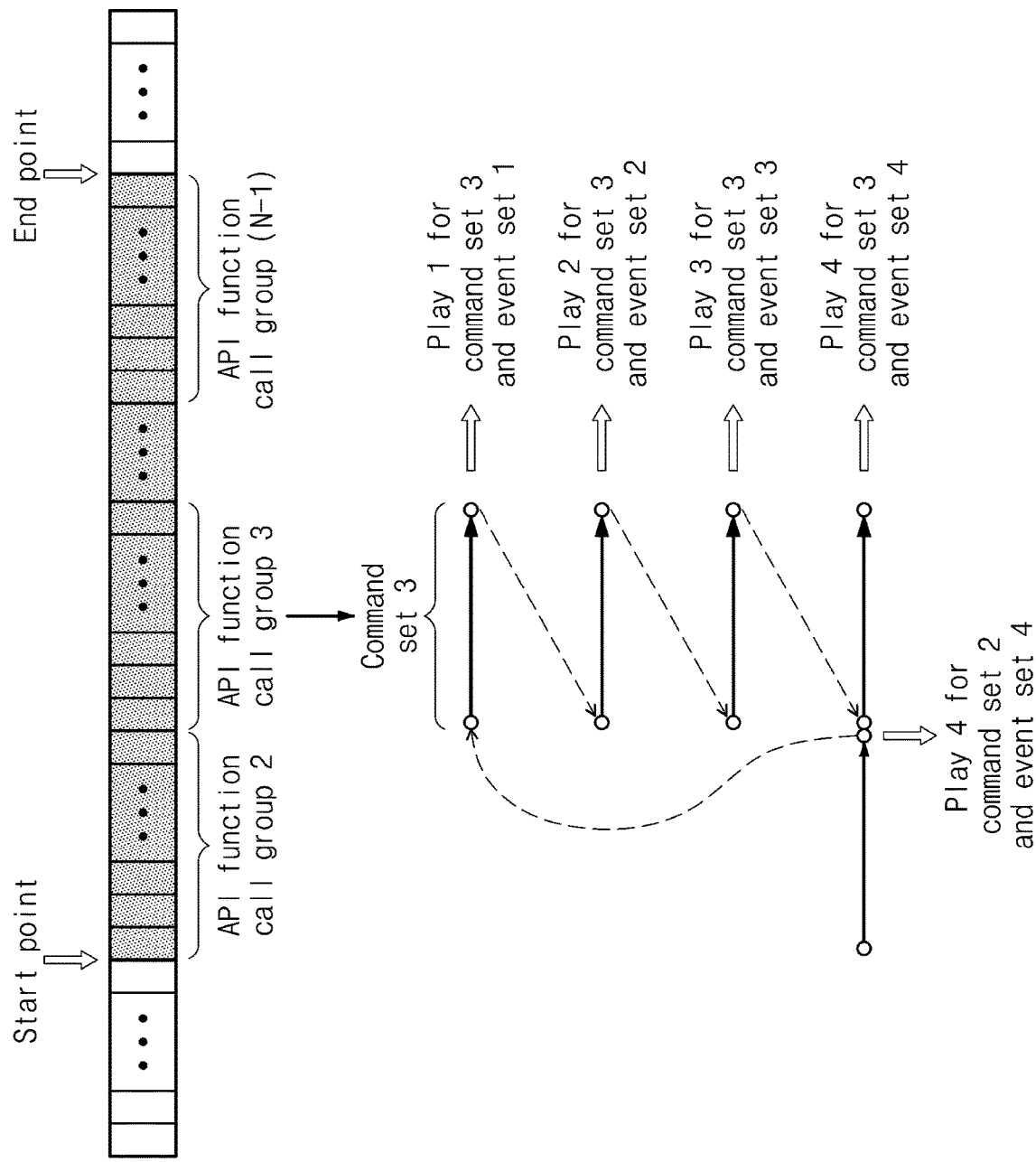
Figure 14:
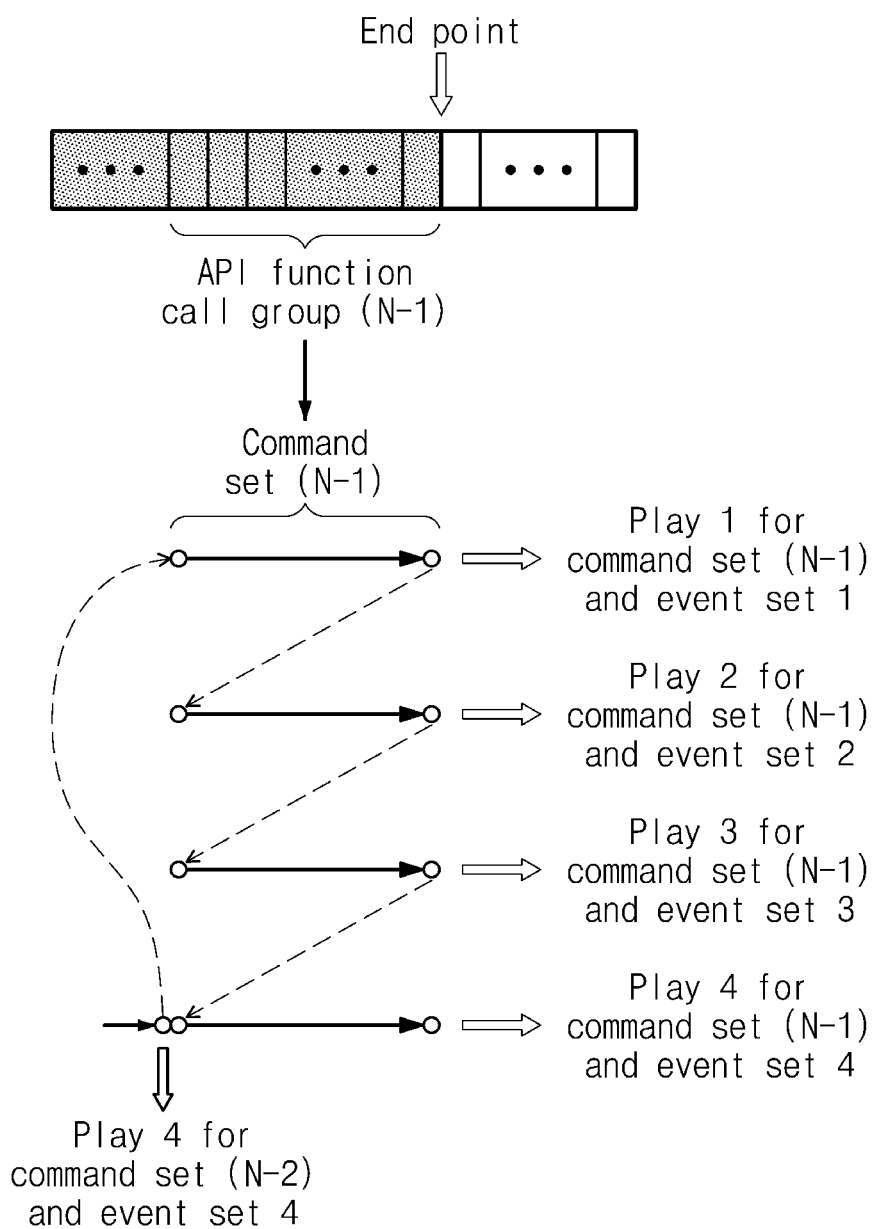

FIGS. 12 to 14 are conceptual diagrams for describing an example replay with regard to operations of the graphic processor device 1400 of FIG. 6.

For example, performance information may be collected with regard to function calls of a second function call group to a (N−1)-th function call group between a start point and an end point. In an example embodiment of FIGS. 12 to 14, a replay may be performed based on command sets, instead of being based on full function call groups. That is, the same play may be repeated (e.g., replayed) with regard to each command set, instead of being repeated with regard to the full function call groups.

First, referring to FIG. 12, the replay may be performed based on commands of a second command set (e.g., command set 2) generated from the second function call group (e.g., API function call group 2). A first play (e.g., play 1) associated with the first event set (e.g., event set 1) may be partially performed to process operations directed by the second command set (e.g., command set 2). After the partial first play is completed, a second play (e.g., play 2) associated with the second event set (e.g., event set 2) may be partially performed to process operations directed by the second command set.

Similarly, after the partial second play is completed, the third play (e.g., play 3) associated with the third event set (e.g., event set 3) may be partially performed, and then the fourth play (e.g., play 4) associated with the fourth event set (e.g., event set 4) may be partially performed. That is, each play may not be performed based on the full function call groups, but each play may be partially performed to repeatedly process operations directed by the second command set (this may be referred to as a partial replay). As each play is performed partially and repeatedly, the numbers of times for all the events of interest may be counted with regard to operations directed by the second command set.

For example, events of interest (e.g., events of the first event set) observed in a first repetition (e.g., the partial first play) of commands of the second command set may be different from events of interest (e.g., events of the second event set) observed in a second repetition (e.g., the partial second play) of the commands of the second command set. Accordingly, events of interest corresponding to the numbers of times counted in the first repetition may be different from events of interest corresponding to the numbers of times counted in the second repetition. For each repetition of operations directed by the second command sets, the numbers of times for different events of interest may be counted.

Afterwards, referring to FIG. 13, a replay may be performed based on commands of a third command set (e.g., command set 3) generated from the third function call group (e.g., API function call group 3). Similar to the partial replay of FIG. 12, the replay of FIG. 13 may also be partially performed to repeatedly process operations directed by the third command set.

For example, a first play (e.g., play 1) associated with the first event set (e.g., event set 1) may be partially performed to process operations directed by the third command set (e.g., command set 3), then a second play (e.g., play 2) associated with the second event set (e.g., event set 2) may be partially performed to process operations directed by the third command set (e.g., command set 3), then a third play (e.g., play 3) associated with the third event set (e.g., event set 3) may be partially performed to process operations directed by the third command set (e.g., command set 3), and then a fourth play (e.g., play 4) associated with the fourth event set (e.g., event set 4) may be partially performed to process operations directed by the third command set (e.g., command set 3).

The partial replay of FIG. 13 may be performed after the partial replay of FIG. 12 is completed. Accordingly, after the numbers of times for all the events of interest are counted with regard to the operations directed by the second command set, the operations directed by the third command set may be processed. In the partial replay of FIG. 13, the operations directed by the third command set may be repeatedly processed such that the numbers of times for all the events of interest are counted with regard to the operations directed by the third command set.

In this manner, a partial replay may be performed based on commands of a command set generated from each function call group.

Referring to FIG. 14, a first replay (e.g., play 1) may be partially performed to repeatedly process operations directed by a (N−1)-th command set (e.g., command set (N−1)) generated from the (N−1)-th function call group (e.g., API function call group (N−1)). The partial replay of FIG. 14 may be performed after the numbers of times for all the events of interest are counted with regard to operations directed by a (N−2)-th command set (e.g., command set (N−2)). For example, a first play (e.g., play 1) associated with the first event set (e.g., event set 1) may be partially performed to process operations directed by the (N−1)-th command set (e.g., command set (N−1)), then a second play (e.g., play 2) associated with the second event set (e.g., event set 2) may be partially performed to process operations directed by the (N−1)-th command set (e.g., command set (N−1)), then a third play (e.g., play 3) associated with the third event set (e.g., event set 3) may be partially performed to process operations directed by the (N−1)-th command set (e.g., command set (N−1)), and then a fourth play (e.g., play 4) associated with the fourth event set (e.g., event set 4) may be partially performed to process operations directed by the (N−1)-th command set (e.g., command set (N−1)).

As a partial replay is performed with regard to all command sets, each play may be performed with regard to operations directed by all the command sets. Accordingly, all plays may be performed such that the numbers of times where all the events of interest respectively occur are counted with regard to full function calls.

Figure 15:
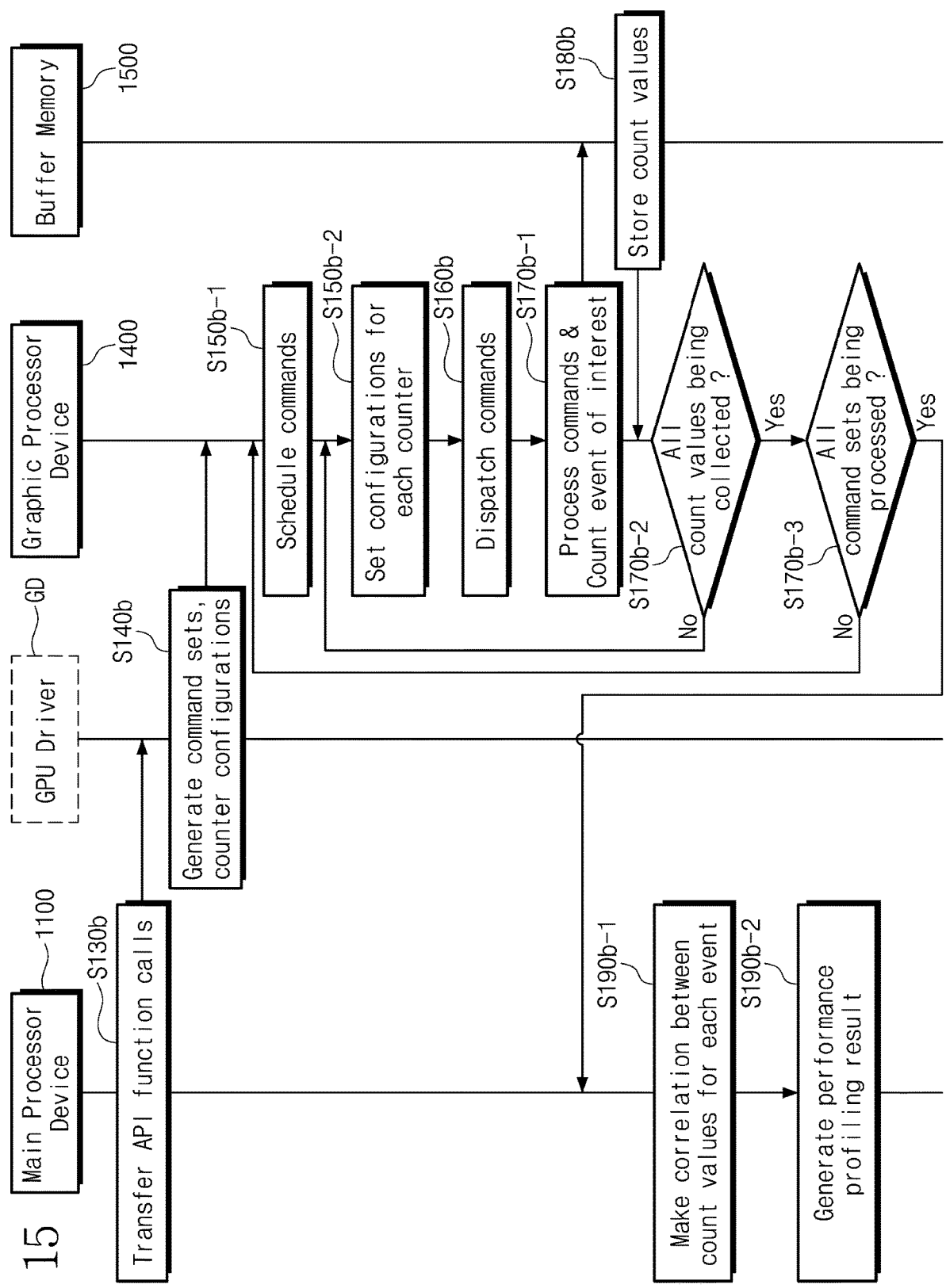
FIG. 15 is a flowchart describing an example method of collecting performance information through an example replay of FIGS. 12 to 14.

FIG. 15 is a flowchart describing an example method of collecting performance information through the example replay of FIGS. 12 to 14. For example, the example method of FIG. 15 may be performed after operation S110 and operation S120 of FIG. 7.

As the application AP is executed, function calls may be generated from the portion of the program codes to be processed at the graphic processor device 1400 among the program codes of the application AP. The main processor device 1100 may input the function calls to the GPU driver GD (S130*b*). Meanwhile, transferring the function calls may accompany transferring information of profiling configurations.

The GPU driver GD may generate command sets based on the function calls, and may generate counter configuration information based on the profiling configurations (S140*b*). In the graphic processor device 1400, the scheduler 1410 may receive the command sets and the counter configuration information from the GPU driver GD.

Unlike the example of FIGS. 9 and 10, in the example embodiment of FIGS. 12 to 15, the scheduler 1410 may receive each of command sets from the GPU driver GD only once. The received command sets may be managed in the command queue CQ.

The scheduler 1410 may schedule commands of the command sets (S150*b*-1), and may set configurations of the performance counters 1451 to 1459 based on the counter configuration information (S150*b*-2). The commands may be dispatched to the functional units 1431 to 1439 according to a result of the scheduling (S160*b*).

While the functional units 1431 to 1439 process operations directed by the commands, the performance counters 1451 to 1459 may count the numbers of times where the events of interest respectively occur (S170*b*-1). The counted numbers of times may be temporarily stored in the registers 1471, 1472, and 1479, and the count values CV may be stored in the buffer memory 1500 after the operation processing is completed (S180*b*).

Afterwards, the graphic processor device 1400 (or, in some example embodiments, the GPU driver GD or the main processor device 1100) may determine whether all count values are collected with regard to one command set (S170*b*-2). If not (S170*b*-2, No), operation S150*b*-2 to operation S180*b* may be repeated.

The repetition of operation S150*b*-2 to operation S180*b* may be provided to count the numbers of times for different events of interest with regard to the same command set. In the repetition of operation S150*b*-2 to operation S180*b*, commands of one command set may be repeatedly scheduled and processed such that the numbers of times for all the events of interest are counted with regard to operations directed by the one command set. To this end, in operation S150*b*-2, the scheduler 1410 may newly change the configurations of the performance counters 1451 to 1459 for each repetition of commands of one command set.

For example, when the numbers of times for all the events of interest are not completely counted with regard to the operations directed by the second command set even though the operations directed by the second command set are processed, the scheduler 1410 may change the configurations of the performance counters 1451 to 1459 and may repeatedly schedule the commands of the second command set, such that the numbers of times where events of interest corresponding to the numbers of times which are not counted yet respectively occur are counted. For example, the scheduler 1410 may change the configurations of the performance counters 1451 to 1459 and may repeatedly schedule the commands of the second command set so as to count the events of interest that are not yet counted. Accordingly, for each play of a partial replay, the numbers of times for different events of interest may be counted.

As such, in the example embodiment of FIGS. 12 to 15, a replay may be performed based on a unit of a command set managed in the command queue CQ, instead of being based on full function calls. The command-set-based replay may be performed based on commands of command sets managed in the command queue CQ, without repeatedly receiving command sets from the GPU driver GD.

When all count values are collected with regard to one command set (S170*b*-2, Yes), the graphic processor device 1400 (or, in some example embodiments, the GPU driver GD or the main processor device 1100) may determine whether all command sets are processed (S170*b*-3). If all command sets are not processed (S170*b*-3, No), operation S150*b*-1 to operation S180*b* may be repeated.

The repetition of operation S150*b*-1 to operation S180*b* may be provided to count the numbers of times for different events of interest with regard to all command sets. In operation S150*b*-1, the scheduler 1410 may schedule commands of a new command set such that the numbers of times for events of interest are counted with regard to operations directed by different command sets.

For example, after the numbers of times for all events of interest are counted with regard to the operations directed by the second command set, the scheduler 1410 may schedule commands of the third command set. Accordingly, the functional units 1431 to 1439 may process the operations directed by the third command set, and the performance counters 1451 to 1459 may count the numbers of times where events of interest respectively occur with regard to the third command set.

When all the command sets are processed, the main processor device 1100 (or, in some example embodiments, the GPU driver GD or the graphic processor device 1400) may make correlation between the count values CV associated with the events of interest (S190*b*-1). In the example embodiment of FIGS. 12 to 15, count values corresponding to one event may be separately calculated with regard to each of command sets, and thus the main processor device 1100 (or, in some example embodiments, the GPU driver GD or the graphic processor device 1400) may correlate and match the count values corresponding to the one event each other.

For example, for corresponding events, the numbers of times counted with regard to the operations directed by the second command set may be respectively added with the numbers of times counted with regard to the operations directed by the third command set. This will be further described with reference to FIGS. 16 to 17B. The main processor device 1100 may generate performance information or a performance profiling result, based on the count values CV and the correlation (S190*b*-2).

FIGS. 16 to 17B are conceptual diagrams for describing example methods of managing count values with regard to the example replay of FIGS. 12 to 15.

Referring to FIG. 16, for example, after the first play (e.g., play 1) is partially performed on the operations directed by the second command set (e.g., command set 2) with regard to events of interest of the first event set (e.g., event set 1), the registers 1471, 1472, and 1479 may respectively store count values CV[E1][1], CV[E2][1], and CV[E3][1]. The count values CV[E1][1], CV[E2][1], and CV[E3][1] may respectively correspond to the numbers of times where first, second, and third events E1, E2, and E3 of the first event set occurs while the operations directed by the second command set are processed.

After the partial first play is completed and before the second play (e.g., play 2) is performed on the operations directed by the second command set with regard to events of interest of the second event set (e.g., event set 2), the registers 1471, 1472, and 1479 may respectively output the count values CV[E1][1], CV[E2][1], and CV[E3][1]. Accordingly, the count values CV[E1][1], CV[E2][1], and CV[E3][1] may be stored in the buffer memory 1500. After the count values CV[E1][1], CV[E2][1], and CV[E3][1] are output to the buffer memory 1500, the partial second play may be performed.

Referring to FIGS. 16 to 17B, in this manner, the second to fourth plays (e.g., play 2 to play 4) may be partially performed, and count values CV[E4][1] to CV[E12][1] may be temporarily stored in the registers 1471, 1472, and 1479. The count values CV[E4][1] to CV[E12][1] may respectively correspond to the numbers of times where fourth to twelfth events E4 to E12 of the second to fourth event sets (e.g., event set 2 to event set 4) occur while the operations directed by the second command set are processed.

After operation processing of the second to fourth plays (e.g. play 2 to play 4) associated with the second command set is completed, the count values CV[E4][1] to CV[E12][1] may be stored in the buffer memory 1500. After the replay for the second command set is completed and the numbers of times for all the events of interest E1 to E12 are counted, the first play may be performed on operations directed by the third command set (e.g., command set 3) with regard to the events of interest E1, E2, and E3 of the first event set.

Figure 17A:
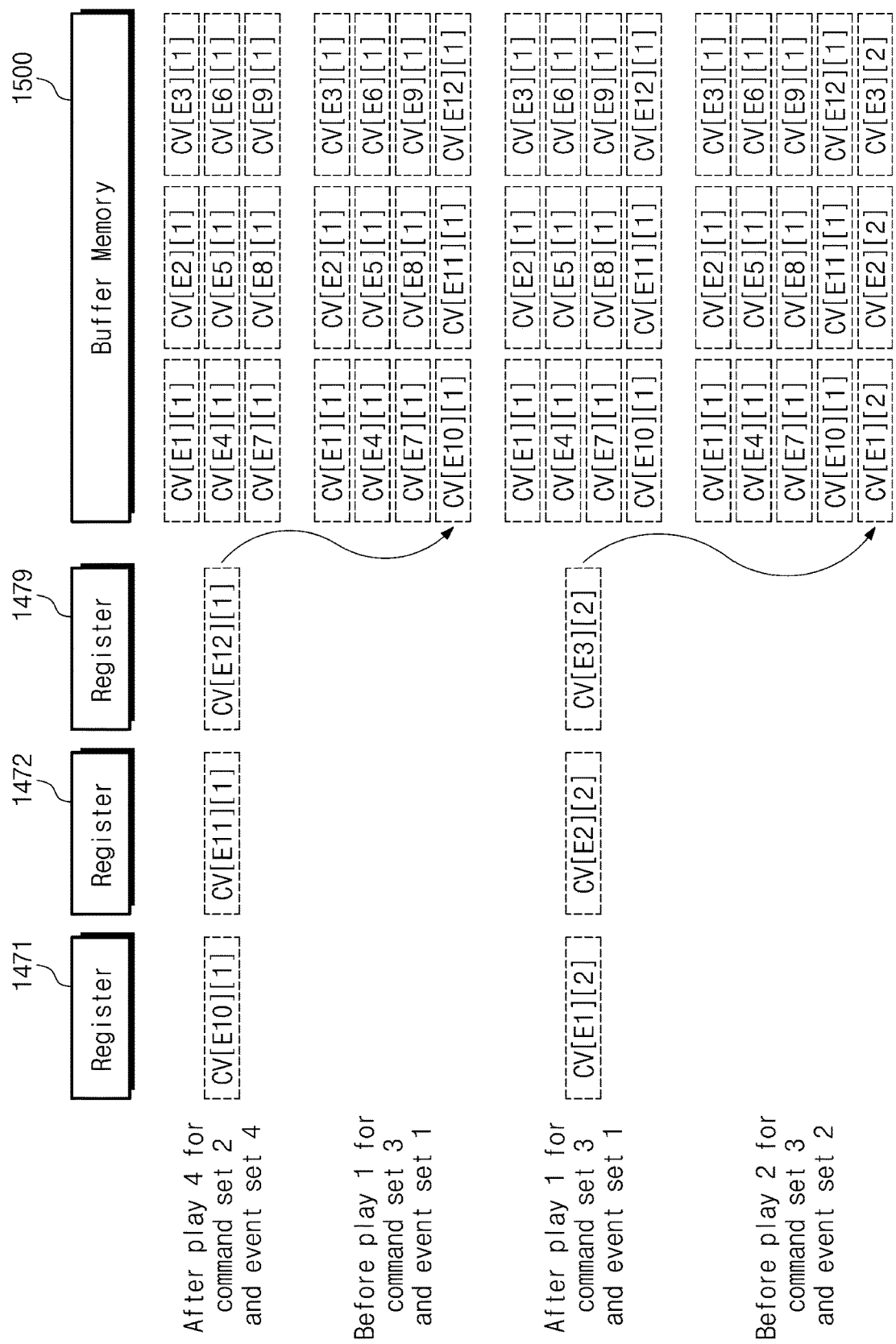

Referring to FIG. 17A, in some example embodiments, the performance counters 1451 to 1459 may count the numbers of times where the events of interest E1, E2, and E3 occur while the operations directed by the third command set are processed, without reading the count values CV[E1][1] to CV[E3][1] stored in the buffer memory 1500. In this case, the registers 1471, 1472, and 1479 may store count values CV[E1][2], CV[E2][2], and CV[E3][2]. Afterwards, before the second play is performed on the operations directed by the third command set with regard to the events of interest E4, E5, and E6 of the second event set, the count values CV[E1][2], CV[E2][2], and CV[E3][2] may be stored in the buffer memory 1500.

In some example embodiments, the count values CV[E1][1] and CV[E1][2] may be separately managed in the buffer memory 1500. Meanwhile, a sum of the count values CV[E1][1] and CV[E1][2] may correspond to the number of times where the event of interest E1 occurs with regard to processing the operations directed by the second and third command sets. Accordingly, when the main processor device 1100 separately obtains the count values CV[E1][1] and CV[E1][2] from the buffer memory 1500, the main processor device 1100 may add the count values CV[E1][1] and CV[E1][2] to provide the number of times where the event of interest E1 occurs as the performance information or the performance profiling result.

Referring to FIG. 17B, in some example embodiments, before the first play is performed on the operations directed by the third command set with regard to the events of interest E1, E2, and E3 of the first event set, the count values CV[E1][1] to CV[E3][1] of the buffer memory 1500 may be read to the registers 1471, 1472, and 1479. While the operations directed by the third command set are processed, the performance counters 1451 to 1459 may count the numbers of times where the events of interest E1, E2, and E3 occur to change (e.g., update) the count values CV[E1][1] to CV[E3][1] of the registers 1471, 1472, and 1479.

As a result, the registers 1471, 1472, and 1479 may respectively store sums of count values: "CV[E1][1]+CV[E1][2]", "CV[E2][1]+CV[E2][2]", and "CV[E3][1]+CV[E3][2]". The sums of the count values "CV[E1][1]+CV[E1][2]", "CV[E2][1]+CV[E2][2]", and "CV[E3][1]+CV[E3][2]" may respectively correspond to the numbers of times where the events of interest E1, E2, and E3 occur with regard to processing the operations directed by the second and third command sets.

Afterwards, before the second play is performed on the operations directed by the third command set with regard to the events of interest E4, E5, and E6 of the second event set, the sums of the count values "CV[E1][1]+CV[E1][2]", "CV[E2][1]+CV[E2][2]", and "CV[E3][1]+CV[E3][2]" may be stored in the buffer memory 1500. In addition, the count values CV[E4][1] to CV[E6][1] of the buffer memory 1500 may be read to the registers 1471, 1472, and 1479.

In this manner, in some example embodiments, the count values CV[E1][1] and CV[E1][2] may be managed as the sum "CV[E1][1]+CV[E1][2]". The main processor device 1100 may directly obtain the sum "CV[E1][1]+CV[E1][2]" from the buffer memory 1500. The main processor device 1100 may use the sum "CV[E1][1]+CV[E1][2]" to provide the number of times where the event of interest E1 occurs as the performance information or the performance profiling result.

Figure 18:
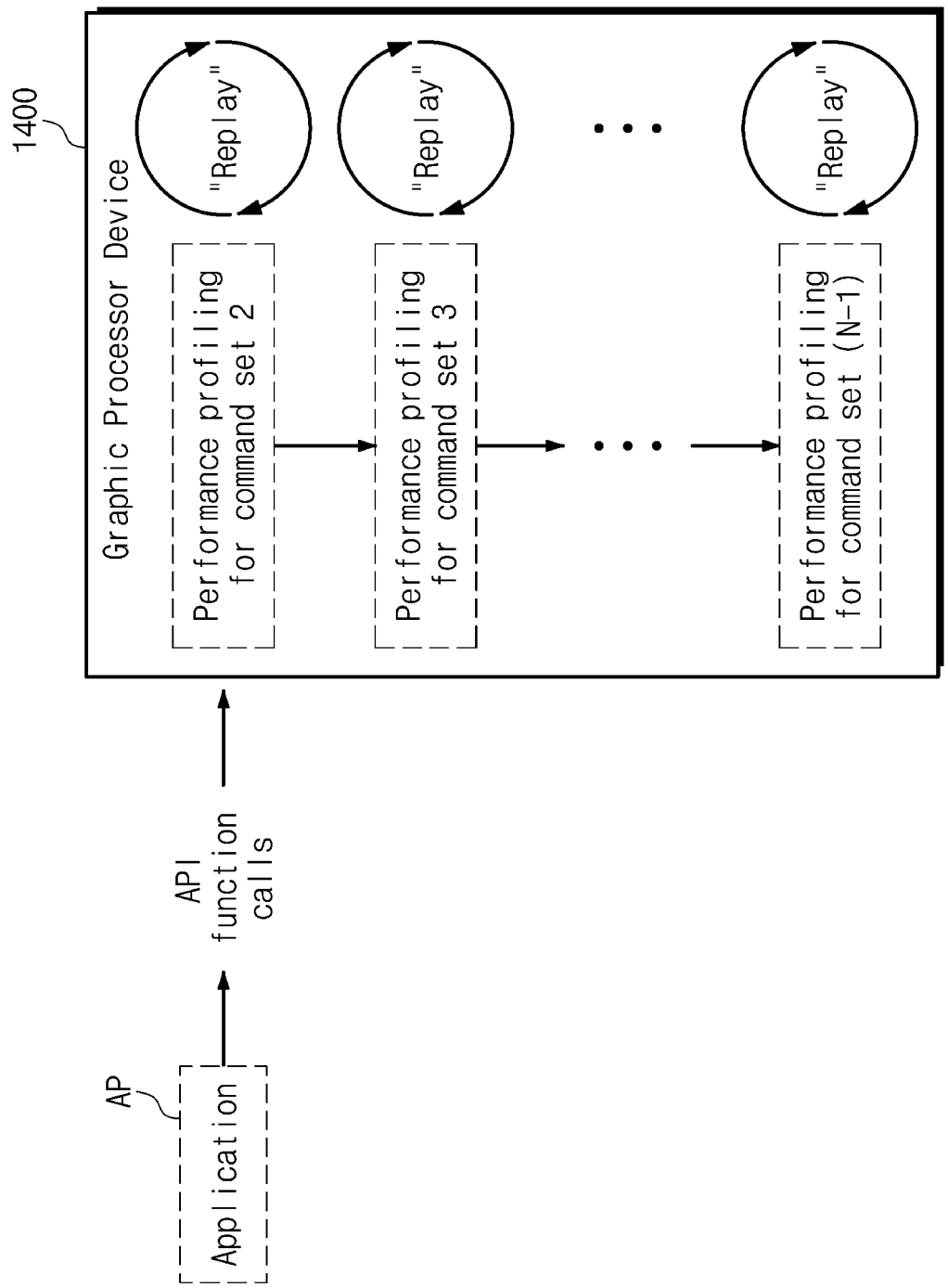
FIG. 18 is a conceptual diagram for describing an example replay of FIGS. 12 to 15.

FIG. 18 is a conceptual diagram for describing the example replay of FIGS. 12 to 15.

In the example embodiment of FIGS. 12 to 15, function calls that are generated based on the program codes of the application AP may be converted to the command sets. Each of the command sets may be provided to the graphic processor device 1400 once. A replay may be based on a unit of a command set managed in the command queue CQ.

For example, to collect performance information and perform performance profiling with regard to a second command set, the operations directed by the second command set may be replayed. The operations directed by the second command set may be repeated until the numbers of times for all the events of interest are counted with regard to the operations directed by the second command set. After the repetition of the operations directed by the second command set is completed, operations directed by the third to (N-1)-th command sets may be replayed based on a command set in a similar manner.

With regard to the example embodiment of FIGS. 12 to 15, the buffer memory 1500 may retain the command queue CQ, and the system memory 1200 may not retain information of function calls. Accordingly, in a condition where the limited number of registers is provided, a replay may be implemented even using the system memory 1200 having a small capacity, and an available memory area of the system memory 1200 may be used to process other operations.

When the information of the function calls is not retained, information of arguments or parameters may not be also retained, and the system memory 1200 may be used more efficiently. In particular, even though the electronic system 1000 implemented with a mobile or portable device includes the system memory 1200 having a small capacity, it may be possible to collect sufficient performance information associated with a lot of events.

In addition, it may be unnecessary to convert full function calls and transfer command sets to the graphic processor device 1400 for each play. Accordingly, efficiency of performance profiling may be prevented from being degraded.

Further, as command sets are generated only once and are provided to the graphic processor device 1400 only once, commands may be identically scheduled and processed for each play. That is, a replay may be implemented based on consistent commands and data, and consistency of commands and data for replay may be improved. Accordingly, it may be easy to make correlation between count values, and the correlation between the count values may be accurately established. The command-set-based replay may be employed advantageously for a next-generation API of a command queue manner, such as Vulkan API.

In the example embodiment of FIGS. 12 to 15, the number of times where each replay is repeated may be determined based on the number of registers and the number of command sets. In some example embodiments, profiling configurations and/or counter configurations may include information associated with the number of times where each replay is repeated, according to determination of the user 10 or the electronic system 1000. In some cases, the user 10 or the electronic system 1000 may forcibly stop or terminate the replay.

Figure 19:
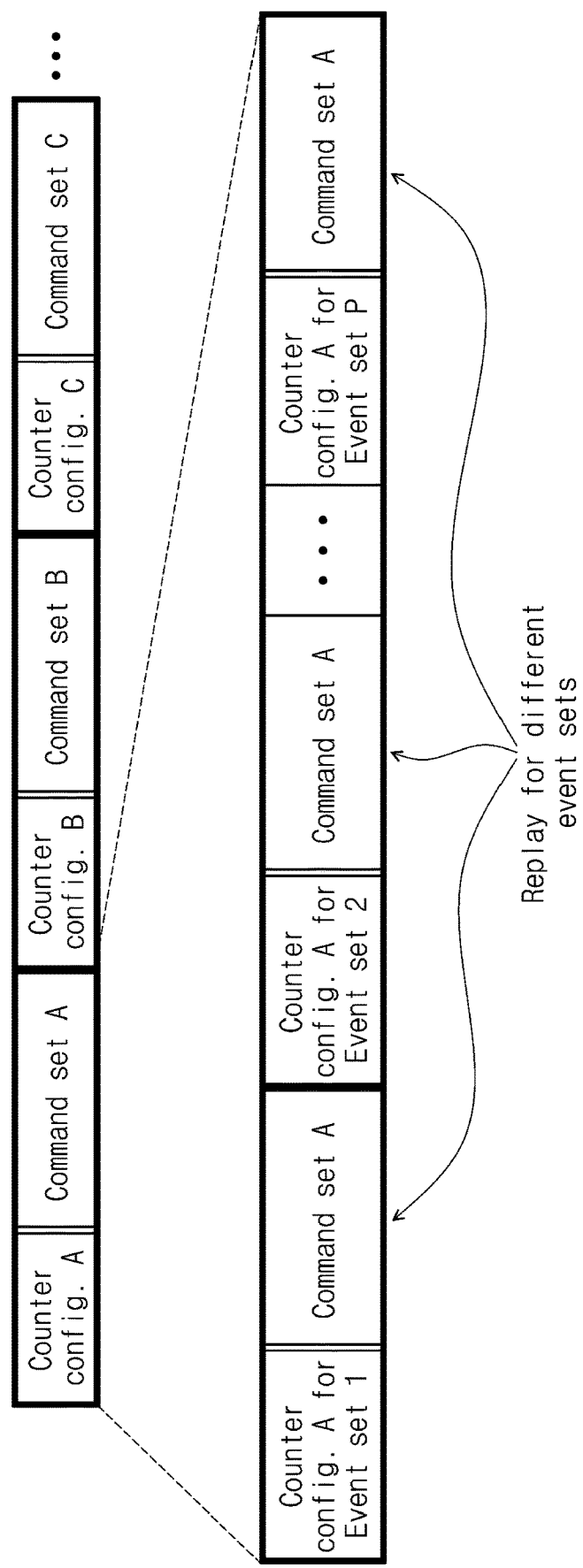
FIGS. 19 and 20 are conceptual diagrams for describing an example relationship between a command set and a counter configuration value with regard to an example replay of FIGS. 12 to 15.
Figure 20:
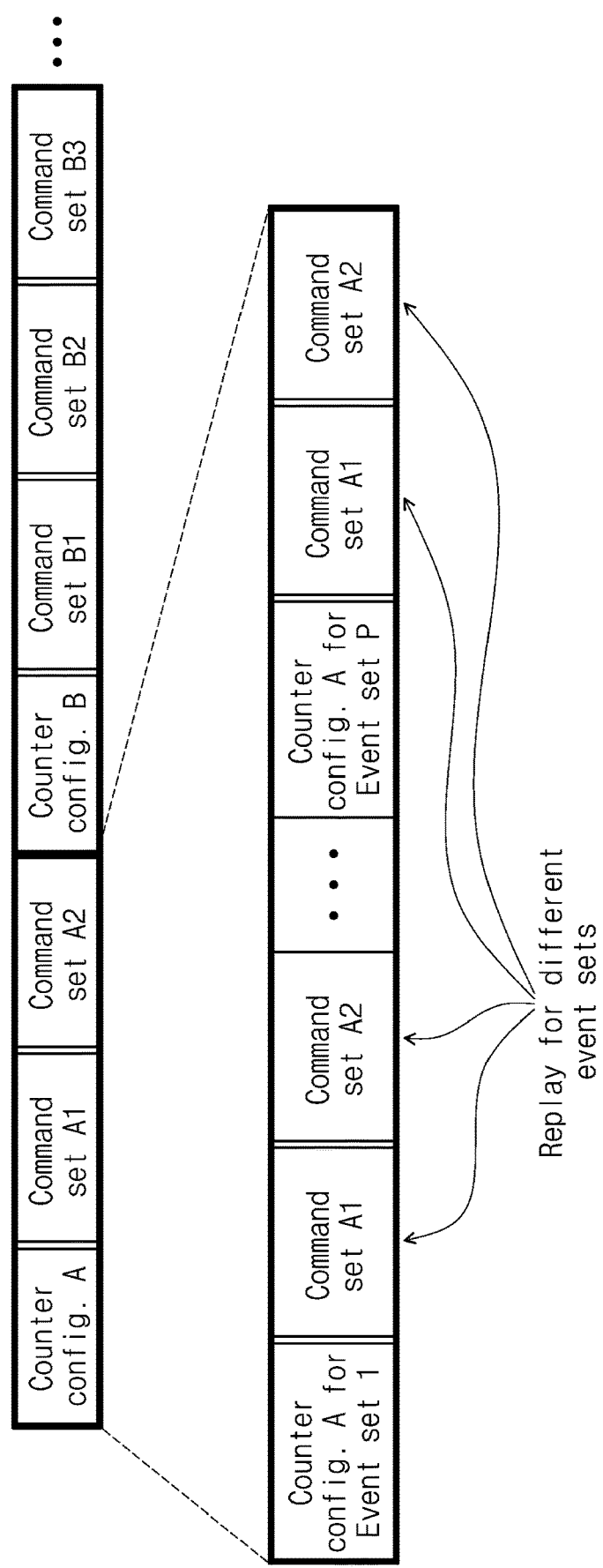

FIGS. 19 and 20 are conceptual diagrams for describing an example relationship between a command set and a counter configuration value with regard to the example replay of FIGS. 12 to 15.

As described above, command sets may be associated with counter configurations. When performance profiling is requested, the scheduler 1410 may receive counter configuration information together with the command sets.

Referring to FIG. 19, command sets "A", "B", and "C" may be provided, and counter configuration information may include counter configuration values "A", "B", and "C". The counter configuration values "A", "B", and "C" may respectively correspond to the command sets "A", "B", and "C", and may be referenced to set configurations of the performance counters 1451 to 1459 which are associated with processing operations directed by the command sets "A", "B", and "C".

The counter configuration values "A", "B", and "C" may be provided to differently set the configurations of the performance counters 1451 to 1459. For example, configurations of the performance counters 1451 to 1459 set by the counter configuration value "A" may be different from configurations of the performance counters 1451 to 1459 set by the counter configuration value "B".

In this case, configurations of the performance counters 1451 to 1459 associated with processing operations directed by the command set "A" may be different from configurations of the performance counters 1451 to 1459 associated with processing operations directed by the command set "B". Accordingly, the numbers of times where events of interest occur with regard to the operations directed by the command sets "A", "B", and "C" may be counted under the differently set configurations of the performance counters 1451 to 1459.

For example, when the command sets "A", "B", and "C" are associated with graphic processing, the operations directed by the command sets "A", "B", and "C" may have different characteristics or may require different operation conditions. For example, when an image to be displayed on the display device 1405 is brilliantly varied, the command sets "A", "B", and "C" may have different conditions with regard to various factors such as the number of "DrawCall" commands, colors, an image size, and/or the like. In this case, as illustrated in FIG. 19, the different counter configuration values "A", "B", and "C" may be provided.

With regard to the example embodiment of FIGS. 12 to 15, the operations directed by the command set "A" may be repeated. For each repetition, the command set "A" may correspond to a counter configuration value for an event set associated with each repetition. For example, when there are different P event sets, the operations directed by the command set "A" may be replayed P times under the differently set configurations of the performance counters 1451 to 1459 with regard to respective repetitions.

Referring to FIG. 20, command sets "A1", "A2", "B1", "B2", and "B3" may be provided, and counter configuration information may include counter configuration values "A" and "B". In an example of FIG. 20, one counter configuration value may correspond to a plurality of command sets.

For example, the counter configuration values "A" may correspond to the command sets "A1" and "A2", and may be referenced to set configurations of the performance counters 1451 to 1459 associated with processing operations directed by the command sets "A1" and "A2". The counter configuration values "B" may correspond to the command sets "B1", "B2", and "B3", and may be referenced to set configurations of the performance counters 1451 to 1459 associated with processing operations directed by the command sets "B1", "B2", and "B3".

The counter configuration values "A" and "B" may be provided to differently set configurations of the performance counters 1451 to 1459. Meanwhile, as the command sets "A1" and "A2" correspond to the one counter configuration value "A", configurations of the performance counters 1451 to 1459 associated with processing operations directed by the command set "A1" may be the same as configurations of the performance counters 1451 to 1459 associated with processing operations directed by the command set "A2".

Accordingly, the numbers of times where the events of interest occur with regard to the operations directed by the command sets "A1" and "A2" may be counted under the same configurations of the performance counters 1451 to 1459 set by the one counter configuration value "A". Similarly, the numbers of times where the events of interest occur with regard to operations directed by the command sets "B1", "B2", and "B3" may be counted under the same configurations of the performance counters 1451 to 1459 set by the one counter configuration value "B".

For example, when the command sets "A1", "A2", "B1", "B2", and "B3" are associated with simple operation processing other than graphic processing, it is likely that the operations directed by the command sets "A1", "A2", "B1", "B2", and "B3" have the same characteristic or similar characteristics or require the same operation condition or similar operation conditions. In this case, to improve efficiency of operation processing and efficiency of a bus bandwidth, one counter configuration value may be provided to correspond to a plurality of command sets.

For example, command sets that require the same condition or similar conditions may be grouped to correspond to one counter configuration value. The command sets grouped to correspond to one counter configuration value may be in advance determined depending on the intention of the user 10 or an operation policy of the electronic system 1000. Alternatively, the command sets grouped to correspond to one counter configuration value may dynamically vary depending on various factors such as context tendency, a data type, and/or the like.

With regard to the example embodiment of FIGS. 12 to 15, the operations directed by the command sets "A1" and "A2" may be repeated. For each repetition, the command sets "A1" and "A2" may correspond to a counter configuration value for an event set associated with each repetition.

For example, when there are different P event sets, the operations directed by the command sets "A1" and "A2" may be replayed P times under the differently set configurations of the performance counters 1451 to 1459 with regard to respective repetitions. However, when commands of the command set "A2" are processed after the repetition of commands of the command set "A1" is completed, the configurations of the performance counters 1451 to 1459 may be maintained without change.

The above descriptions are intended to provide example configurations and operations for implementing the disclosed embodiments. The scope and spirit of the present invention may include implementations which are obtained by simply changing or modifying the above example embodiments, in addition to the above-described example embodiments. Also, the scope and spirit of the present invention includes implementations which are accomplished by easily changing or modifying the above-described example embodiments afterwards.

What is claimed is:

1. A processor device comprising:
a scheduler configured to schedule first commands of a first command set and second commands of a second command set; and
a performance counter configured to count numbers of times where events of interest occur with regard to processing first operations directed by the first command set and second operations directed by the second command set, where each of the numbers of times corresponds to one of the events of interest,
wherein the scheduler is further configured to repeatedly schedule the first commands of the first command set such that the numbers of times for all the events of interest are counted with regard to the first operations,
wherein the scheduler is further configured to repeatedly schedule the second commands of the second command set after the numbers of times for all the events of interest are counted with regard to the first operations, and
wherein the scheduler is further configured to set configurations of the performance counter such that the performance counter counts the numbers of times for the events of interest.

2. The processor device of claim 1, wherein the scheduler is further configured to change the configurations of the performance counter for each repetition of the first commands of the first command set.

3. The processor device of claim 1, wherein when the numbers of times for all the events of interest are not completely counted with regard to the first operations after processing the first operations is performed, the scheduler is further configured to change the configurations of the performance counter and repeatedly schedule the first commands of the first command set, such that uncounted events of interest are counted.

4. The processor device of claim 1, wherein from among the events of interest corresponding to the counted numbers of times, first events of interest which correspond to numbers of times counted in a first repetition of the first commands of the first command set are different from second events of interest which correspond to numbers of times counted in a second repetition of the commands of the first command set.

5. The processor device of claim 4, further comprising:
registers configured to store count values corresponding to the counted numbers of times,
wherein the registers are further configured to:
store first count values corresponding to the first events of interest in the first repetition,
output the first count values such that the first count values are stored in a buffer memory, after the first repetition is completed, and
store second count values corresponding to the second events of interest in the second repetition, after the first count values are output.

6. The processor device of claim 5,
wherein the registers are further configured to store third count values corresponding to the first events of interest in a third repetition of the second commands of the second command set, and
wherein a sum of the first count values and the third count values is provided for numbers of times where the first events of interest occur with regard to processing the first operations and the second operations.

7. A processor device comprising:
a scheduler configured to repeatedly schedule first commands of a first command set and second commands of a second command set such that a processor circuit processes first operations directed by the first command set and second operations directed by the second command set;
a performance counter, with configurations set by the scheduler, configured to count numbers of times where events of interest occur while the processor circuit processes the first operations and the second operations, where each of the numbers of times corresponds to one of the events of interest; and
registers configured to store count values corresponding to the counted numbers of times,
wherein, when a number of the events of interest is greater than a number of the registers, the first operations are repeatedly processed such that the numbers of times for all the events of interest are counted with regard to the first operations, and the second operations are processed after the numbers of times for all the events of interest are counted with regard to the first operations.

8. The processor device of claim 7, wherein the first command set and the second command set are received at the scheduler based respectively on first function calls and second function calls generated according to execution of an application.

9. The processor device of claim 7,
wherein the scheduler receives each of the first command set and the second command set once from a driver.

10. The processor device of claim 7,
wherein each of the first command set and the second command set is configured in one packet unit or one batch unit, and
wherein the first commands of the first command set are successively processed in a first processing interval, and the second commands included in the second command set are successively processed in a second processing interval.

11. The processor device of claim 7, wherein the events of interest include at least one of a cache miss, a bus collision, a processing-idle state, a vertex count, or a primitive count.

12. The processor device of claim 7, wherein after the numbers of times for all the events of interest are counted with regard to the first operations, the second operations are repeatedly processed such that the numbers of times for all the events of interest are counted with regard to the second operations.

13. The processor device of claim 12, wherein the numbers of times counted with regard to the first operations for each of the events of interest are added with the numbers of times counted with regard to the second operations for each of the corresponding events of interest.

14. A processor device comprising:
a scheduler configured to schedule first commands of a first command set and second commands of a second command set;
a processor circuit configured to process operations directed by each of a plurality of command sets; and
a performance counter, with configurations set by the scheduler, configured to count numbers of times where events of interest occur while the processor circuit processes the operations directed by each of the plurality of command sets, where each of the numbers of times corresponds to one of the events of interest,
wherein the operations directed by each of the plurality of command sets are repeatedly processed until the numbers of times for all the events of interest are counted with regard to the operations directed by each of the plurality of command sets, and
wherein, after the numbers of times for all the events of interest are counted with regard to first operations directed by the first command set of the plurality of command sets, second operations directed by the second command set of the plurality of command sets are processed.

15. The processor device of claim 14,
wherein the scheduler is further configured to receive the plurality of command sets from a driver, such that the processor circuit processes the operations directed by each of the plurality of command sets, and
wherein the scheduler receives each of the plurality of command sets once.

16. The processor device of claim 15, wherein the scheduler is further configured to:
repeatedly schedule the first commands of the first command set such that the first operations directed by the first command set are repeatedly processed, when the numbers of times for all the events of interest are not completely counted with regard to the first operations, and
schedule the second commands of the second command set such that the second operations directed by the second command set are processed, after the numbers of times for all the events of interest are counted with regard to the first operations.

17. The processor device of claim 14,
wherein the scheduler is further configured to set the configurations of the performance counter based on counter configuration information, such that numbers of times for different events of interest are counted for each repetition of the operations directed by each of the plurality of command sets.

18. The processor device of claim 17,
wherein the counter configuration information includes a plurality of counter configuration values provided to differently set the configurations of the performance counter,
wherein the plurality of command sets respectively correspond to the plurality of counter configuration values, and
wherein the numbers of times for the events of interest are counted under the differently set configurations of the performance counter with regard to the operations directed by the plurality of command sets.

19. The processor device of claim 17,
wherein the counter configuration information includes a counter configuration value,
wherein the plurality of command sets correspond to the counter configuration value, and
wherein the numbers of times for the events of interest are counted under a configuration of the performance counter set by the counter configuration value, with regard to the operations directed by the plurality of command sets.

* * * * *